(12) United States Patent
Scifo et al.

(10) Patent No.: US 8,269,110 B2
(45) Date of Patent: Sep. 18, 2012

(54) SCRUNCH-IT EARPIECE / WIRE ORGANIZER AND METHOD OF USING SAME

(76) Inventors: George Scifo, Sayreville, NJ (US); Karen Ann Scifo, Sayreville, NJ (US)

( * ) Notice: Subject to any disclaimer, the term of this patent is extended or adjusted under 35 U.S.C. 154(b) by 499 days.

(21) Appl. No.: 11/784,387

(22) Filed: Apr. 7, 2007

(65) Prior Publication Data
US 2008/0099229 A1 May 1, 2008

(51) Int. Cl.
*H01B 7/00* (2006.01)
(52) U.S. Cl. .......................................................... 174/135
(58) Field of Classification Search .................. 174/36, 174/110 R, 112, 113 R, 115, DIG. 11
See application file for complete search history.

(56) References Cited

U.S. PATENT DOCUMENTS

| | | | | |
|---|---|---|---|---|
| 2,585,054 A | | 2/1952 | Stachura | 174/36 |
| 3,441,951 A | * | 4/1969 | Lee | 24/31 V |
| 4,588,868 A | * | 5/1986 | Bertagna et al. | 381/382 |
| 4,802,638 A | | 2/1989 | Burger et al. | 242/85.1 |
| 5,391,838 A | * | 2/1995 | Plummer, III | 174/36 |
| 5,861,579 A | * | 1/1999 | Bickersteth et al. | 174/136 |
| 5,906,507 A | * | 5/1999 | Howard | 439/501 |
| 5,949,026 A | * | 9/1999 | DeFlorio | 174/117 R |
| 5,958,315 A | * | 9/1999 | Fatato et al. | 264/46.6 |
| 6,374,126 B1 | | 4/2002 | MacDonald, Jr. et al. | 455/569 |
| 6,480,611 B2 | * | 11/2002 | Hashimoto et al. | 381/371 |
| 6,826,782 B2 | * | 12/2004 | Jordan | 2/94 |
| 6,909,050 B1 | | 6/2005 | Bradford | 174/110 |
| 7,077,693 B1 | | 7/2006 | Symons | 439/501 |
| 7,498,510 B2 | * | 3/2009 | Chen et al. | 174/36 |
| 2005/0069147 A1 | * | 3/2005 | Pedersen | 381/74 |
| 2005/0098594 A1 | * | 5/2005 | Truong | 224/275 |
| 2005/0123164 A1 | | 6/2005 | Yao et al. | 381/380 |
| 2006/0166720 A1 | * | 7/2006 | Dixon | 455/575.6 |
| 2006/0185873 A1 | * | 8/2006 | Johnson | 174/36 |

FOREIGN PATENT DOCUMENTS

| | | |
|---|---|---|
| EP | 1 509 062 A1 * | 2/2005 |
| EP | 1509062 | 2/2005 |
| JP | 7211146 | 8/1995 |
| JP | 10308992 | 11/1998 |
| JP | 2004/056636 | 2/2004 |

* cited by examiner

*Primary Examiner* — William Mayo, III
(74) *Attorney, Agent, or Firm* — Ernest D. Buff; Ernest D. Buff & Assoc.; Margaret A. LaCroix, Esq.

(57) ABSTRACT

An earpiece/wire organizer houses and maintains wires in an untangled manner. The earpiece/wire organizer has a sleeve constructed with mating spine pieces that house wires therein. Simply scrunching or compressing the sleeve with a single hand motion engages the mating spine pieces in an attached configuration and compresses the sleeve and wire housed therein. When the user desires to lengthen or elongate the wire, the user simply pulls or elongates the sleeve with a single hand motion that disengages the mating spine pieces and lengthens the sleeve and wire housed therein. Where more than one sleeve is provided, the sleeves are further constructed to releaseably connect to one another.

23 Claims, 20 Drawing Sheets

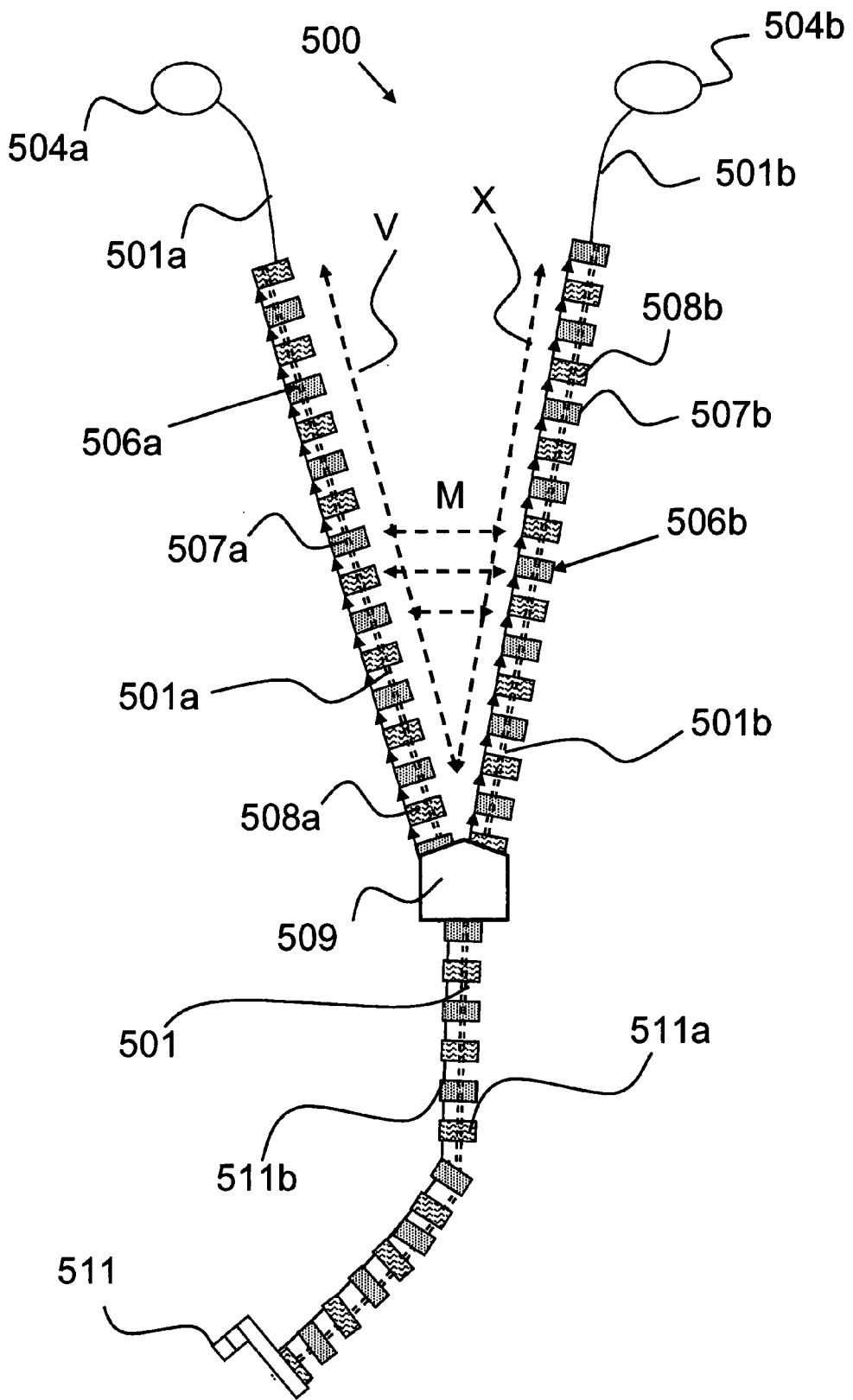

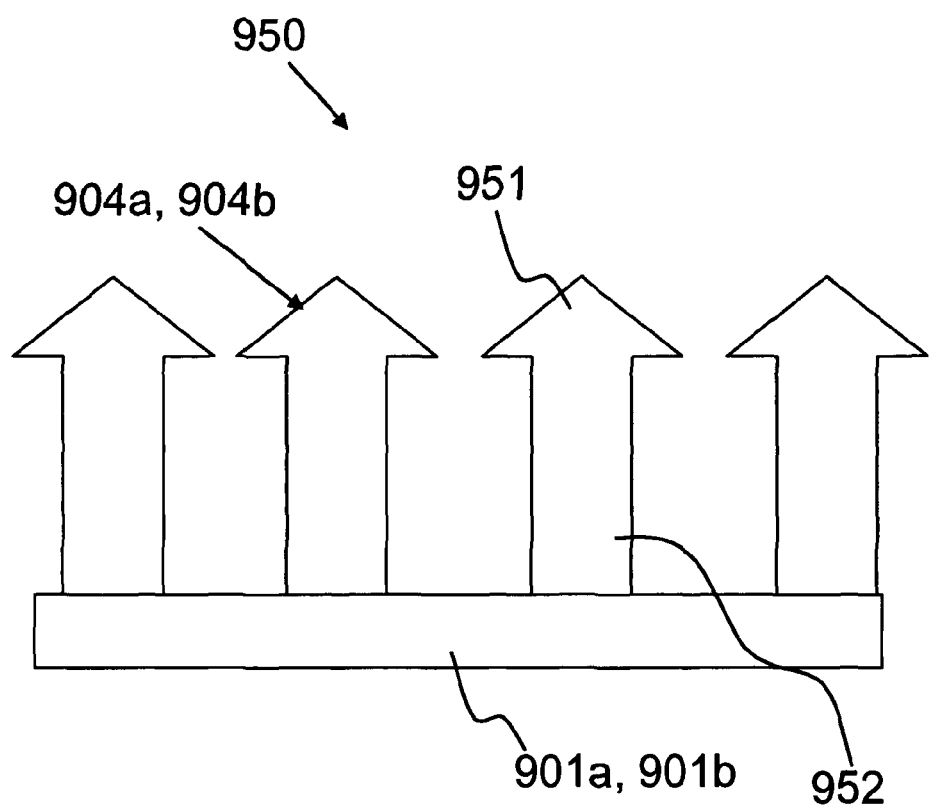

SCRUNCH-IT EARPIECE / WIRE ORGANIZER AND METHOD OF USING SAME

BACKGROUND OF THE INVENTION

1. Field of the Invention

The present invention relates to an earpiece/wire organizer and method for using same to house and maintain wires in an untangled manner; and more particularly, to a wire organizer that provides a sleeve constructed with a plurality of mating spine pieces appointed to releaseably engage with one another.

2. Description of the Prior Art

Typical earphone or headset constructions comprise a main audio wire which is adapted to connect to a jack integrated within an electronic, audio or optical device. In one form of these organizers, left and right wires connect with the main audio wire to form a "Y"-type construct which delivers audio from an electronic device such as a music device, mp3 player, and/or cellular phone. The left and right wires, or upper legs of the Y, are associated with left and right ear buds which, when worn, allow the user to hear music or sound transmitted from the electronic device. Other earphone or headphone devices involve a single wire attached to a first ear bud and a second ear bud. A microphone jack may additionally be included to transmit audio from the user to the electronic device, and to another user's electronic device; such wiring arrangements are used in the mobile phone industry.

In practice, headphone wires are stored in a pocketbook, gym bag, pocket or the like. Unfortunately, the wires forming the headphones tend to tangle and knot making it difficult to quickly connect and use the ear piece with the electronic device or transmission device. This entanglement can be very annoying. Oftentimes untangling of the wires can be difficult and time consuming. Even still, frequent entanglement and untangling can cause eventual damage to the left and right wires, impacting sound quality.

Various devices are currently provided for organizing wires. However, none of the devices provide the ability to compress and elongate the wires in a manner which maintains severability of the wires and prevents entanglement thereof.

Several of the wire organizer devices heretofore disclosed and utilized involve coverings or jackets constructed with a unilateral elongated body having edges appointed with engageable zipper elements. Exemplary of these types of jacket coverings, are the following patents. U.S. Pat. No. 2,585,054 to Stachura discloses a flexible sheet of electrically conductive material having meeting but separable closure edges with engageable tooth and groove zipper elements adapted to encircle a conductor; and U.S. Pat. No. 5,391,838 to Plummer discloses a rectangular casing with inner and outer surfaces and edges having a conventional zipper provided there along so that the casing may be closed to form a removable tube around conductors to be shielded. These devices are generally separate from the wires and merely operate to wrap around or encase the wires in order to neatly store same when the zipper elements on the edges of the elongated body are engaged. Organization of the wires by application of these jacket-like devices results from bundling within the jacket covering; the wires themselves are not provided with integrated organization means. The wires located within the jacket are not maintained in a separate yet joined manner. Consequently, they may be subject to tangling within the jacket. When the jacket is removed, the wires must be untangled from one another.

Other wire organizers involving zip-up devices are generally constructed with zip-up mechanisms integrated along bodies of wires operable to releaseably join the wires upon engagement of a zipper or sliding element. For example: U.S. Pat. No. 5,949,026 to DeFlorio discloses a pair of tangle resistant electrical test leads attached to a nonconductive slide fastener, such as a nylon zipper, that co-joins cords by engaging the slide fastener or zipper; U.S. Pat. No. 6,909,050 to Bradford discloses an electrical cable system including a first electrical cable and a second electrical cable constructed to releaseably join to form a co-joined cable by strip and groove mating; U.S. Patent Application Publication No. 2005/0069147 to Pedersen discloses a headset wire for a portable electronic device including a zipper used to releaseably join or separate pairs of wires; Foreign Patent Publication No. EP 1509062 to Fung et al. discloses a headphone apparatus appointed with a zipper slider for sliding along cords of the headphone and thereby joining or disjoining two cords; Foreign Patent Publication No. JP 07211146 to Tateno discloses a stereophonic earphone cable having a fastener on a side of each the left and right earphone cables and a chuck or slider to co-join the cables; and Foreign Patent Publication No. JP 2004056636 to Kihachiro discloses a headphone apparatus integrated with a slider type fastener over substantially the entire length of each cable so that each branch cable can be co-joined.

These integrated zip-up devices, as well as aforediscussed jacket constructs, fail to provide a sleeve surface that enables scrunching or compression and elongation or lengthening of the wires. As such, the co-joined and bundled wires cannot be compressed for enhanced compact storage. Coiling of the co-joined wires and/or jacket containing the bundled wires may be an option to achieve a more orderly neat maintenance; however, this would subject the co-joined wires and/or jacket of the bundled wires to tangling.

Another broad categorical type of apparatus for organizing wires involves devices having a member for pulling two wires together without lengthwise co-joining of the wires. For example: U.S. Pat. No. 6,374,126 to MacDonald et al. discloses a hands-free earpiece headset configured such that a second earpiece is integrally mounted and stowed against a first earpiece. The headset further includes a sliding member which is configured to slidably advance and retract about the first and second cords for organization of same. Foreign Patent Publication No. JP 10308992 to Masuda et al. discloses a device having two left headset wires that are appointed to be completely contained in a cylindrical bag which slidably engages to house the wires therein when the headset is being carried. These types of organization apparatuses fail to provide compression or elongation of the enclosed wire in an orderly, tangle free manner. The wires are not co-joined together, but are merely housed in close proximity with engagement of the slide or bag, respectively. As a result, the wires are subject to entangling with one another, especially within the bag assembly storage structure.

Various wire organizing devices involve a spool type member engageable with associated wires for stowage thereof. For example: U.S. Pat. No. 4,802,638 to Burger et al. discloses a cord stowage device that includes a spool having opposed ends with cup-shaped members and a channel through which a cable slidably passes, cavities shaped to receive earphones therein for storage are also provided on the outside of the cup-shaped members; U.S. Pat. No. 7,077,693 to Symons discloses a cable management device having a body with an axis and at least one planar flange and cable retainer for allowing removable attachment of a cable during axial winding in a single plane via a spool; and U.S. Patent Application Publication No. 2005/0123164 to Yao et al. discloses a mobile device cord holder constructed with retaining regions defining a cord holding area appointed to hold a cord in a non-tangling manner as the wire is wrapped or spooled around the cord holding area. Wires associated with these spool type devices do not engage with one another to form a single/co-joined wire. Nor do these spool type devices provide the functionality of compressing or elongating the wires. Instead the wires are merely spooled within the device for storage. As the wires wrap around the spool, the wires are prone to tangling.

Notwithstanding the efforts of prior art workers to construct an earpiece or wire organizer that prevents or mitigates entanglement of wires during storage and carrying, there remains a need in the art for an earpiece or wire organizer that can be readily engaged by simply scrunching or compressing and pulling or elongating wires together with a single hand motion. Specifically, there is a need in the art for an earpiece or wire organizer that includes a sleeve appointed to house a substantial portion of a wire. Further, there is a need in the art for an earpiece or wire organizer that provides a sleeve constructed with mating spine pieces arranged in relation to one another to releaseably engage with one another in a stacked relationship. Moreover, there is a need in the art for an earpiece or wire organizer that provides a sleeve constructed with mating spine pieces arranged in relation to one another to releaseably engage, and thereby compress and elongate a wire housed within the sleeve.

SUMMARY OF THE INVENTION

The present invention relates to an earpiece/wire organizer and method for using same for housing and maintaining wires in an untangled manner. The earpiece/wire organizer provides a sleeve constructed with mating spine pieces that house wires therein to prevent or mitigate entanglement during storage and carrying. Simply scrunching or compressing the sleeve with a single hand motion engages the mating spine pieces in an attached configuration and compresses the sleeve and wire housed therein. When the user desires to lengthen or elongate the wire, the user simply pulls or elongates the sleeve with a single hand motion that disengages the mating spine pieces and lengthens the sleeve and wire housed therein. Where more than one sleeve is provided, the sleeves are further constructed to releaseably attach to one another.

The earpiece/wire organizer for housing and maintaining wires in an untangled manner includes at least one flexible sleeve having a proximal end, distal end, central body, and an interior cavity. This internal cavity of the sleeve is adapted to receive and house a substantial portion of a wire therein. A plurality of mating spine pieces is arranged in alternating relation along the sleeve. These mating spine pieces are appointed to releaseably engage with one another to compress or elongate the sleeve and the wire housed therein when a scrunching or pulling force, respectively, is administered to the sleeve.

In another embodiment, the earpiece/wire organizer for housing and maintaining wires in an untangled manner includes a first flexible sleeve. This flexible sleeve is adapted to receive and house a first wire therein. First mating spine pieces are further included along the body of the first sleeve. In one further embodiment, these mating spine pieces engage with one another when the sleeve is coiled upon itself. Another related embodiment provides a second sleeve with second mating spine pieces which engage with the first mating spine pieces of the first sleeve to releaseably attach the first and second sleeves together.

Another embodiment provides a wire organizer including a first sleeve. This sleeve is adapted to receive and house a first wire. The sleeve further includes at least one fastening member, for attaching the sleeve to another sleeve, or another fastening member/portion.

A method of using a wire organizer for housing and maintaining wires in an untangled manner is provided. The method includes a first step of placing a substantial portion of a wire within an interior cavity of a sleeve. The sleeve has a central body and proximal and distal ends, and is constructed with a plurality of mating spine pieces arranged in alternating relation. These mating spine pieces are appointed to releaseably engage with one another to compress and elongate the sleeve as well as the wire housed therein. Next, the method provides for attaching a top portion of the wire to the proximal end of the sleeve by way of an upper attachment means integrated within the proximal end of the sleeve. Moreover, a bottom portion of the wire is attached to the distal end of the sleeve by way of a lower wire attachment means integrated within the distal end of the sleeve. With this arrangement, the sleeve with the wire housed therein is cable of scrunching or compressing and engaging the mating spine pieces to compress the wire housed therein, as when the wire is in non-use or shorter wire length is desired. When the wire is in use, or a longer wire length is desired, the wire is elongated or extended lengthwise by pulling on or elongating the sleeve and disengaging the mating spine pieces to lengthen the wire housed therein.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 1b illustrates the scrunched condition of the earpiece or wire organizer shown in FIG. 1a;

FIG. 4 illustrates a schematic view of another embodiment of the earpiece or wire organizer, wherein the headphone involves a Y-shaped construction with dual audio wires attached to ear buds;

FIG. 10b illustrates a schematic view of the spine pieces of the embodiment shown in FIG. 10a;

DETAILED DESCRIPTION OF THE INVENTION

The present invention provides an earpiece/wire organizer and method for using same for housing and maintaining wires in an untangled, readily usable manner. The earpiece/wire organizer provides a flexible sleeve wherein a substantial portion of a wire, preferably for an audio headset device, is housed. A plurality of mating spine pieces in alternating arrangement is integrated within the structure of the sleeve. These mating spine pieces are appointed for engagement with one another for compression and elongation of the sleeve, as well as the wire housed therein. Advantageously, when the length of the wire is desired to be shortened, as during storage or non-use, the earpiece/wire organizer is readily and effortlessly compressed by a single hand motion to compress the wire housed therewithin. Conversely, when the length of the wire is desired to be lengthened, as during use, the earpiece/wire organizer is readily and effortlessly elongated by a single pulling hand motion to lengthen the wire housed therein. Single hand operation, while providing orderly storage, enables a user to quickly use or stow the earpiece in a safe, non-distracting manner without annoyance stemming from wire entanglement.

Figure 1A:
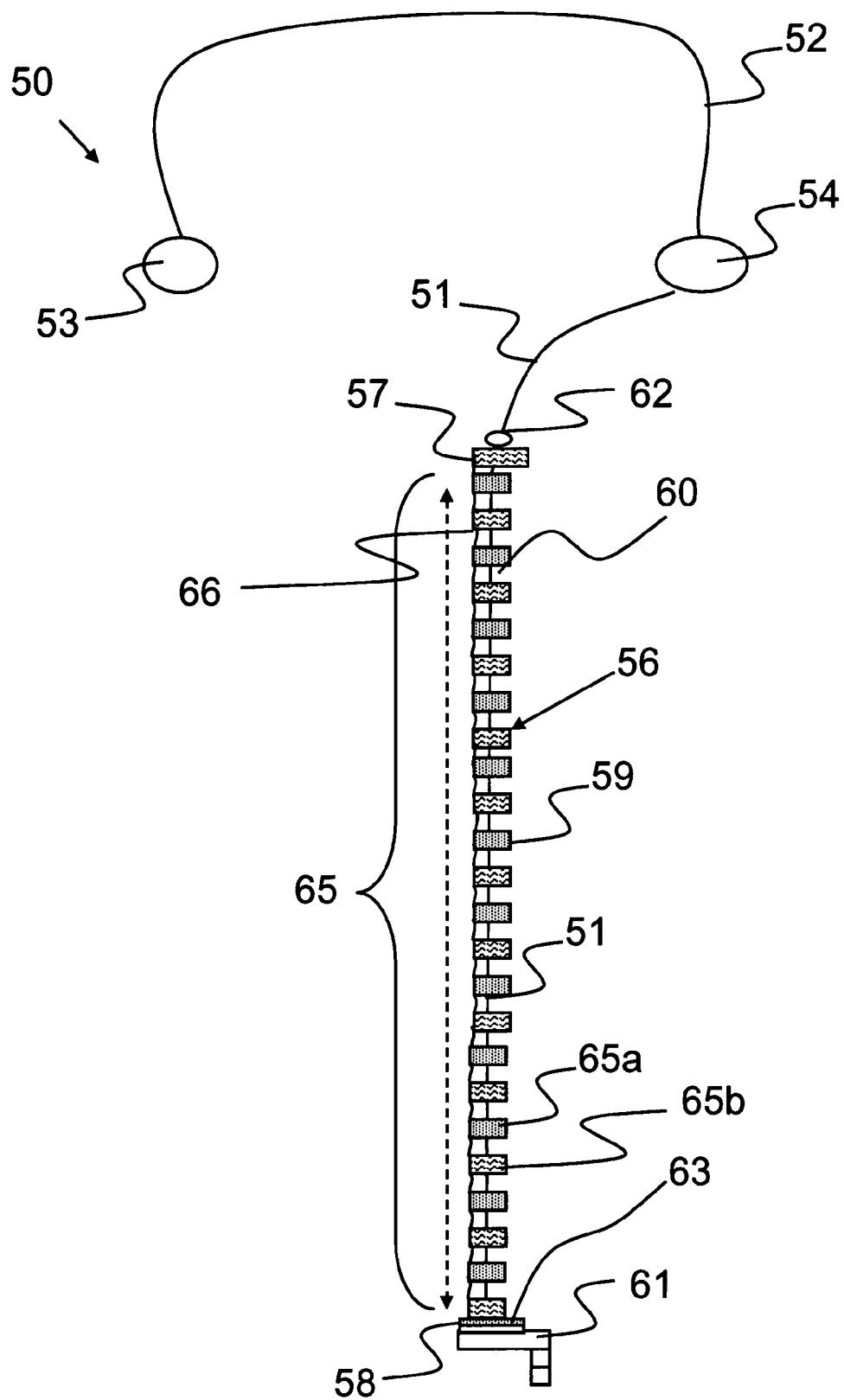
FIG. 1a illustrates a schematic view of an embodiment of the earpiece or wire organizer shown in a substantially elongated/lengthened/or extended form as when the earpiece is in the use condition, wherein the earpiece substantially includes a unilateral wire as utilized as earpieces for cellular phones or other electronic devices.
Figure 1B:
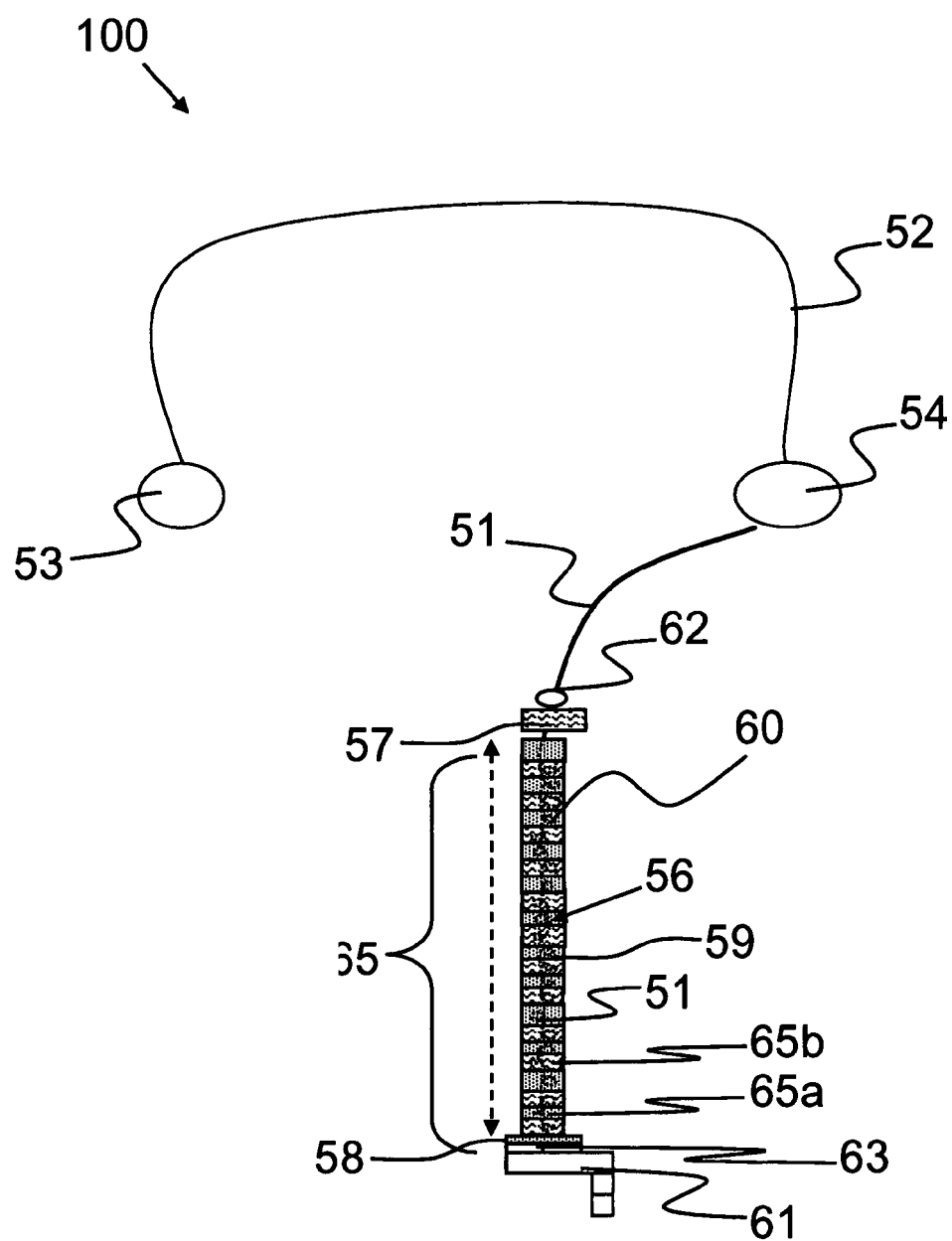

FIGS. 1a and 1b illustrate schematic views of a first embodiment of the earpiece or wire organizer wherein the earpiece substantially includes a unilateral wire of the type utilized with earpieces for cellular phones or other electronic devices. FIG. 1a shows generally at 50 a top view of the earpiece organizer in a substantially elongated/lengthened/or extended form, as when the earpiece is in the use or lengthened condition. While FIG. 1b shows generally at 100 a top view of the earpiece organizer in a substantially scrunched/compressed/or shortened form of the type extant the earpiece is in the non-use or compressed condition. In these particular figures, the wire is part of a headphone that is a unilateral type headphone set having a single unilateral audio wire 51 with ear buds 53, 54 thereon attached. Audio wire 51 has an adaptor 61 appointed to engage with an electronic device by way of the electronic device's headphone or audio jack. The headphone further includes a support wire 52 which attaches left ear bud 53 to right ear bud 54. Audio wire 51 may be part of a device selected from a group consisting of headphones, earpieces, headsets, or like devices.

Wire organizer 50, 100 includes at least one flexible sleeve 56 having a proximal end 57, distal end 58, central body 59, and an interior cavity 60. Sleeve 56 is integrated within the constructs of the audio wire 51 of the headphone/earpiece. Alternatively, sleeve 56 may be an after market attachment to the headphone device (See FIGS. 5a and 5b). Preferably, sleeve 56 is constructed as an elongated cylinder structure. Elongation of sleeve 56 is shown in FIG. 1a, while compression of sleeve 56 is shown in FIG. 1b. A plurality of mating spine pieces 65 are arranged in alternating relation along the length of sleeve 56. These mating spine pieces 65 are appointed to releaseably engage with one another to compress and elongate sleeve 56 and audio wire 51 housed therein. Preferably, mating spine pieces 65 are connected to one another by way of a flexible spine member 66 running lengthwise along sleeve 56 on the side of spine pieces 65. A plurality of mating spine pieces 65 comprising male 65a and female pieces 65b are arranged in alternating relation. In this embodiment, the earpiece/wire organizer preferably involves use of interlocking male and female spine pieces, 65a and 65b, that act as mating fasteners arranged relative to wire 51 of earpiece/wire organizer 50, 100. Preferably, these interlocking male and female spine pieces 65a, 65 utilize hook and loop construction such as a Velcro® fastening mechanism. Particularly, male pieces 65a include hook fasteners and female pieces 65b include loop fasteners.

Sleeve 56 is adapted to receive and house a substantial portion of audio wire 51 within interior cavity 60. Proximal end 57 of sleeve 56 includes an upper attachment means appointed to be attached to a top portion 62 of wire. Distal end 58 of sleeve 56 includes a lower wire attachment means appointed to be attached to a bottom portion 63 of wire 51. A substantial portion of wire 51 is housed within sleeve 56 and traverses within mating spine pieces 65 so that wire 51 is compressed and elongated when sleeve 56 is compressed (FIG. 1b) and elongated (FIG. 1a). Spine pieces 65 may be constructed having a hollow body; alternatively, spine pieces 65 may be constructed having a hollow portion, wherein the hollow portion may be appointed to accommodate a proximate segment of wire 51 when wire 51 is scrunched (See FIGS. 2a and 2b herein for a discussion on the operation of the spine pieces 65).

Figure 2A:
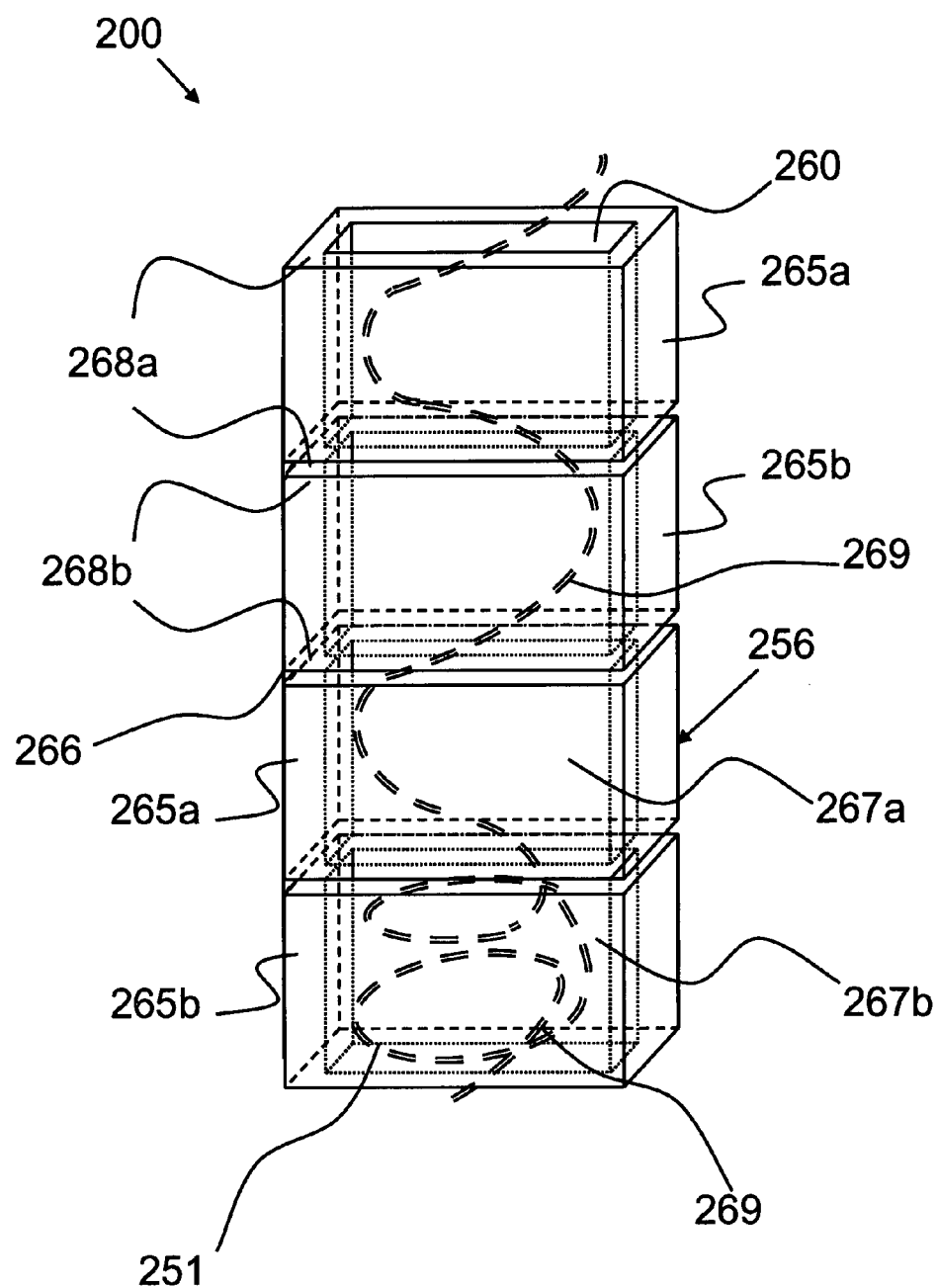
FIG. 2a is a schematic view of an embodiment of the spine pieces engaging with the wire, wherein the wire is housed therein when the sleeve of FIGS. 1a and 1b is in the scrunched or compressed configuration.
Figure 2B:
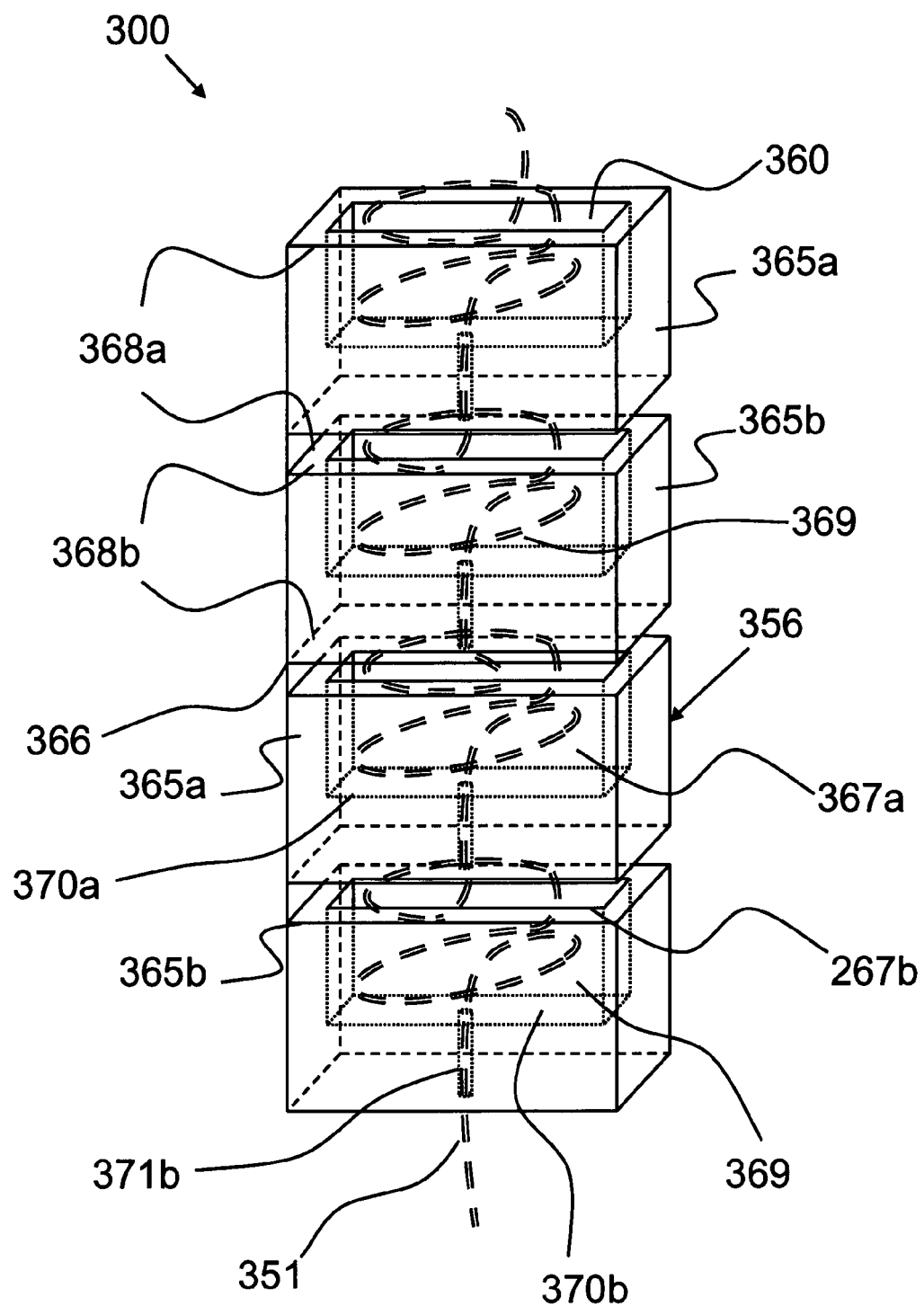
FIG. 2b a schematic view of another embodiment of the spine pieces that engage with the wire so that the wire is housed therein when the sleeve of FIGS. 1a and 1b is in the scrunched or compressed configuration.

FIGS. 2a and 2b illustrate alternative embodiments of the spine pieces; showing the spine pieces engaging with the audio wire as the sleeve is scrunched or compressed. In referring to FIG. 2a, shown generally at 200, alternating male and female spine pieces 265a and 265b, respectively, are shown arranged on sleeve 256. A section of an audio wire 251 traverses chambers 267a, 267b of alternating male and female spine pieces 265a, 265b, respectively. A top portion of wire 251 (not shown) extends downwardly from and is attached to a proximal end (not shown) of sleeve 256 by way of an upper attachment means (not shown). A bottom portion of wire 251 (not shown) extends upwardly from and is attached to a distal end (not shown) of sleeve 256 by way of a lower wire attachment means. As a result wire 251 traverses interior compartment 260 of sleeve 256 and chambers 267a, 267b of mating spine pieces 265a, 265b. Herein, each of the mating spine pieces 265a, 265b is shown as a square or cube-like structure having a hollow interior forming chamber 267a, 267b therein. However, each of the mating spine pieces 265a, 265b may be cylindrical in shape, or have any type of shape or form. These mating spine pieces 256a, 265b may be attached to one another by way of a flexible spine member 266 located on at least one side of spine pieces 265a, 265b, or on all sides of spine pieces 265a, 265b. In this embodiment, the portion of wire 251 shown located in the spine pieces 265a, 265b is not attached thereto but is attached to the proximal and distal ends of sleeve 256 so that wire 251 can hang loosely within chambers 267a, 267b of spine pieces 265a, 265b. Spine pieces 265a, 265b may be entirely coated with mating hook and loop materials, respectively, or surfaces 268a, 268b may contain the hook and loop coated surface, or other attachment engaging structures. When sleeve 256 is compressed by a scrunching motion, spine pieces 265a, 265b move together and attach to one another by way of mating attachment means, preferably via hook and eye attachment. For example, as surfaces 268a and 268b come into contact, the surfaces 268a and 268b releaseably fasten or attach together so that the sleeve 256 becomes compressed. In turn, as wire 251 is attached to both ends, proximal and distal, of sleeve 256 and sleeve 256 become compressed; wire 251 become compressed, with slack portions 269 snaking between chambers 267a, 267b of alternating mating spine pieces 265a, 265b, respectively, traversing interior compartment 260 of sleeve 256 (FIG. 1b). In turn, when sleeve 256 is pulled alternating mating spine pieces 265a, 265b surfaces 268a, 268b become disengaged and sleeve 256 is lengthened or elongated, which in turn lengthens or elongates wire 251 housed therein and fixed at proximal and distal ends of sleeve 251 (FIG. 1a).

In referring to FIG. 1a, shown generally at 300, alternating male and female spine pieces 365a and 365b, respectively, are shown arranged on sleeve 356 having an interior compartment 360. Herein, each of the mating spine pieces 365a, 365b is shown as a square or cube like structure having a hollow chamber 367a, 367b with a chamber floor 370a, 370b, appointed with a chamber aperture 371a, 371b for housing wire 351 and allowing it to pass therein. Wire 351 may be slide-ably housed within each of the chamber apertures 371a, 371b so that spine pieces 365a, 365b can slide along wire 351. Alternatively, wire 351 may be fixed within each of the chamber apertures 371a, 371b so that the spine pieces 365a, 365b can not slide along wire 351. Each of the mating spine pieces 365a, 365b may be cylindrical in shape, or have any type of shape or form. These mating spine pieces 356a, 365b may be attached to one another by way of a flexible spine member 366 located on at least one side of spine pieces 365a, 365b, or on all sides of spine pieces 365a, 365b. Wire 351 is attached to the proximal and distal ends of sleeve 256. Spine pieces 365a, 365b may be entirely coated with mating hook and eye materials, respectively, or surfaces 368a, 368b may contain the hook and eye coated surface, or other attachment engaging structures. In compression operation, as sleeve 356 is compressed by a scrunching motion, spine pieces 365a, 365b move together and attach to one another by way of mating attachment means, preferably via hook and eye attachment. For example, as surfaces 368a and 368b come into contact, the surfaces 368a and 368b releaseably fasten or attach together so that the sleeve 356 becomes compressed. In turn, as wire 351 is attached to both ends, proximal and distal, of sleeve 356 and sleeve 356 become compressed; wire 351 becomes compressed, with slack portions 369 snaking into chambers 367a, 367b of alternating mating spine pieces 365a, 365b, respectively (FIG. 1b). In turn, when sleeve 356 is pulled alternating mating spine pieces 365a, 365b surfaces 368a, 368b become disengaged and sleeve 356 is lengthened or elongated, which in turn lengthens or elongates wire 351 housed therein and fixed at proximal and distal ends of sleeve 351 (FIG. 1a).

Figure 3:
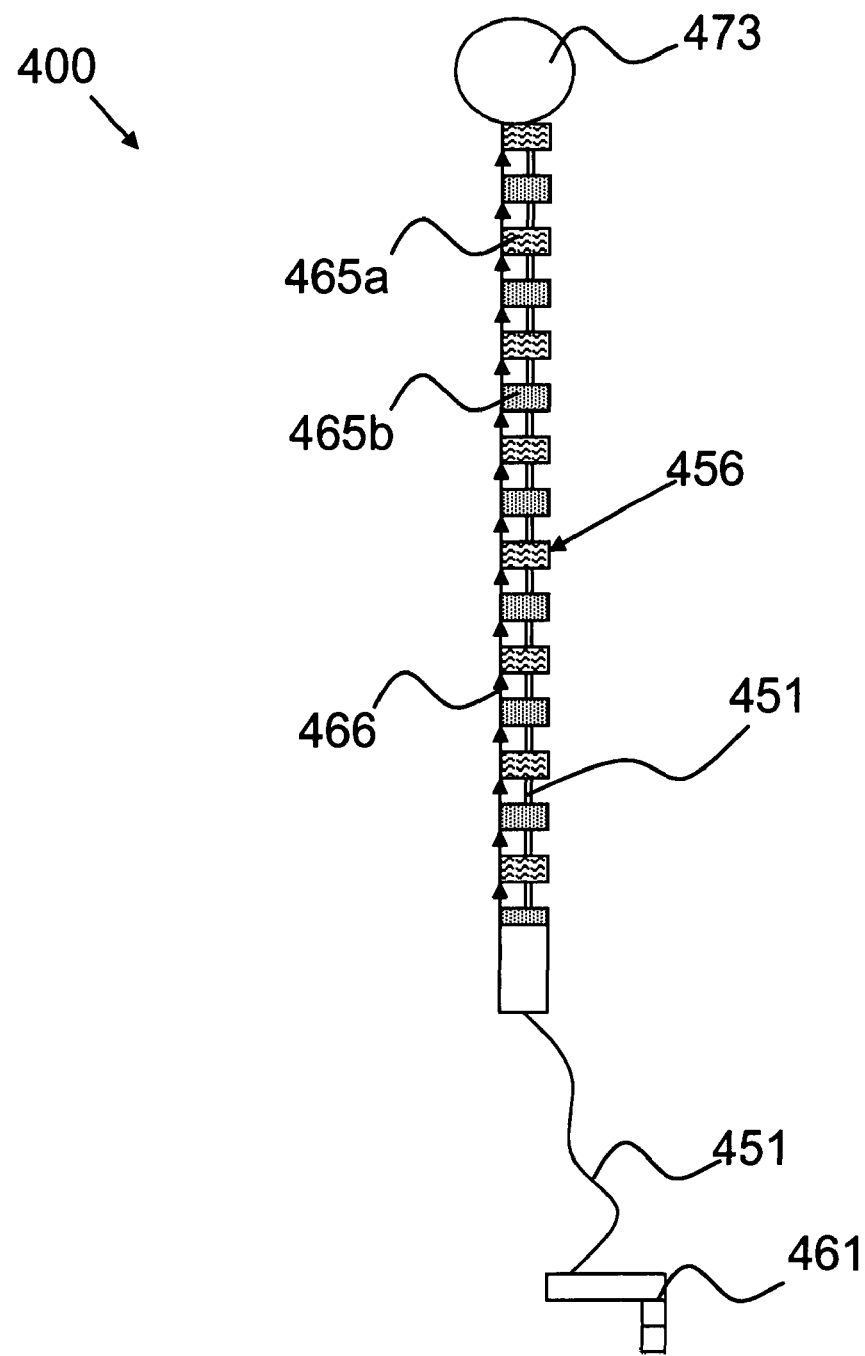
FIG. 3 is a schematic view illustrating another embodiment of the earpiece or wire organizer in a substantially elongated/lengthened/or extended form, the earpiece substantially including a unilateral wire of the type utilized with earpieces for cellular phones or other electronic devices, and the wire of the device being integrated within the sleeve.

FIG. 3 illustrates a schematic view of another embodiment of the earpiece or wire organizer shown at 400. Wire organizer 400 is shown in a substantially elongated/lengthened form, wherein the earpiece substantially includes a unilateral wire as utilized as earpieces for cellular phones or other electronic devices, and the wire of the device is integrated within the sleeve. Audio wire 451 is attached to an ear bud 473 and an adaptor 461 appointed to engage with a jack of an electronic device. A sleeve 456 is integrated within the constructs of the headphone, alternatively, sleeve 456 may be an after market attachment to the headphone device. Sleeve 456 further comprises a plurality of spine pieces constructed with male spine pieces 465a and female spine pieces 465b in alternating relation. These male and female spine pieces 465a, 465b are appointed to releaseably engage with one another. A flexible spine member 466 is provided on at least one side of the sleeve 456. Spine pieces 465a, 465b are appointed to be compressed and elongated, thereby compressing sleeve 456 and wire 451 housed therein.

FIG. 4 illustrates a schematic view of another embodiment of the earpiece or wire organizer, wherein the headphone involves a Y-shaped construction with dual audio wires attached to ear buds, shown generally at 500. In this embodiment, the headphone involves a Y-shaped construction with audio wires 501a and 501b attached to ear buds 504a and 504b, respectively. Audio wires 501a, 501b feed from main wire 501 at divider 509. Main wire 501 is attached to an adapter portion 511 appointed to be plugged-in to a jack of an electronic device. At least two sleeves 506a, 506b are provided for housing left and right wires 501a, 501b. Left and right sleeves 506a, 506b each comprise oppositely arranged mating spine pieces 507a, 508a and 507b, 508b so that each of left and right sleeve 506a, 506b can be compressed (V, X) and elongated, and left and right sleeve 506a, 506b can be releaseably attachable to one another (M). Specifically, left wire sleeve 506a comprises a plurality of alternating male fastener pieces 507a and female spine pieces 508a in a spine-like configuration arranged so that left wire sleeve 506a can be compressed or elongated as shown by way of phantom arrow V. Right wire sleeve 506b further comprises a plurality of alternating male fastener pieces 507b and female spine pieces 508b in a spine-like configuration arranged so that right wire sleeve 506b can be compressed or elongated as shown by way of phantom arrow X. Additionally, male fastener pieces 507a, 507b of left and right wire sleeves 506a, 506b and female fastener pieces 508a, 508b of left and right wire sleeves 506a, 506b are arranged alternate from one another so that the sleeves 506a, 506b can themselves engage with one another as indicated by the phantom arrows shown at M. Between divider 509 and adapter portion 511 a base sleeve 510 with alternating spine pieces 511*a*, 511*b* may be applied to wire 501 so that this lower wire portion may also be compressed and elongated.

The wire organizer may further include a separate patch member with a patch back and a patch front. The patch front of the patch is appointed to releaseably attach to the sleeve with the wire housed therein. Preferably, the patch front comprises a hook or eye fastening surface appointed to releaseably attach to the plurality of mating spine pieces having alternating hook and eye surfaces of the sleeve. The patch back is adhered to a surface of a cellular phone or to a mobile apparatus selected from a group consisting of a music or audio device, belt clip, belt buckle, arm band, or wrist band (see FIGS. 8*a*, 8*b* for a similar embodiment).

Hook and eye construction of the male and female spine pieces of the wire organizer are arranged so that instead of having to zip up or otherwise manipulate the organizer to join the wire leads together, the user simply "scrunches it". The earpiece organizer has several advantages over organizers that use a zipper or otherwise more intricate engaging mechanism. The earpiece organizer has no metal parts. It is lighter in weight, less expensive to manufacture and far more reliable in operation than those organizers utilizing zipper like construction. Zipper-containing organizers require two hands for actuation. They are susceptible to damage when exposed to water or perspiration (as would be the case when used in a marine environment or in a health club). When used in a moving vehicle, the driver may have to remove his hands from the wheel. Numerous other situations exist where use of two hands may occasion increased danger not only for the user, but for other vehicles and pedestrians in the nearby vicinity. Problems inherent in use of zip-up organizers and several of the organizers heretofore disclosed and utilized are virtually eliminated by the earpiece organizer, which is readily scrunched-up with one hand, making its usage much safer and considerably more conducive to today's active life style than prior art zipper containing devices. For example, a person running on a tread mill in a health club oftentimes hits the wire associated with the headphones he is wearing. This can cause the headphones to become dislodged and fall to the floor, disrupting the workout and possibly damaging the headphones as well as injuring the user. The earpiece organizer device is not as susceptible to this problem as it can be readily scrunched with one hand, to shorten or lengthen the wire with which the organizer is associated, thereby keeping the wire from swinging into contact with the runner's hands. Numerous other situations will come to mind wherein an active life style is complimented by the earpiece organizer to an extent not realized by prior art zipper containing organizers. The wire organizer may further include a separate carrying pouch that can attach to a mobile phone.

Figure 5A:
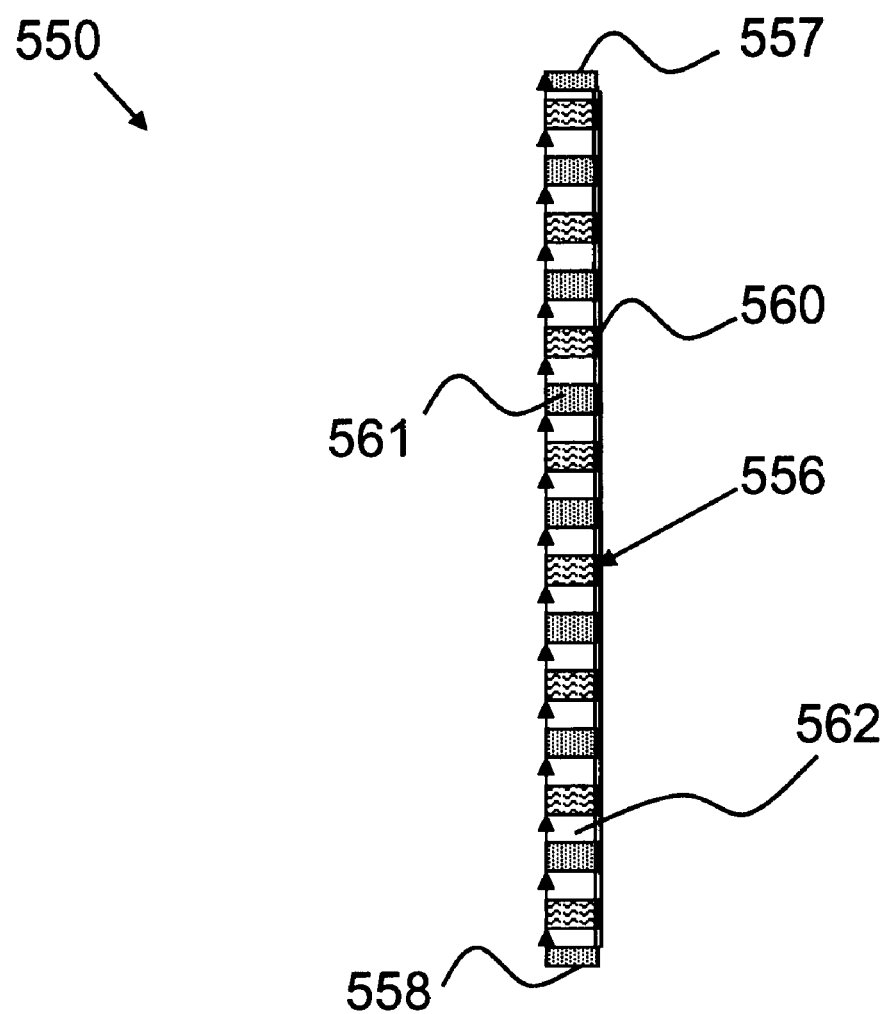
FIG. 5a illustrates an embodiment of the sleeve of the earpiece or wire organizer wherein the sleeve is an aftermarket item appointed to be placed on an existing earpiece.
Figure 5B:
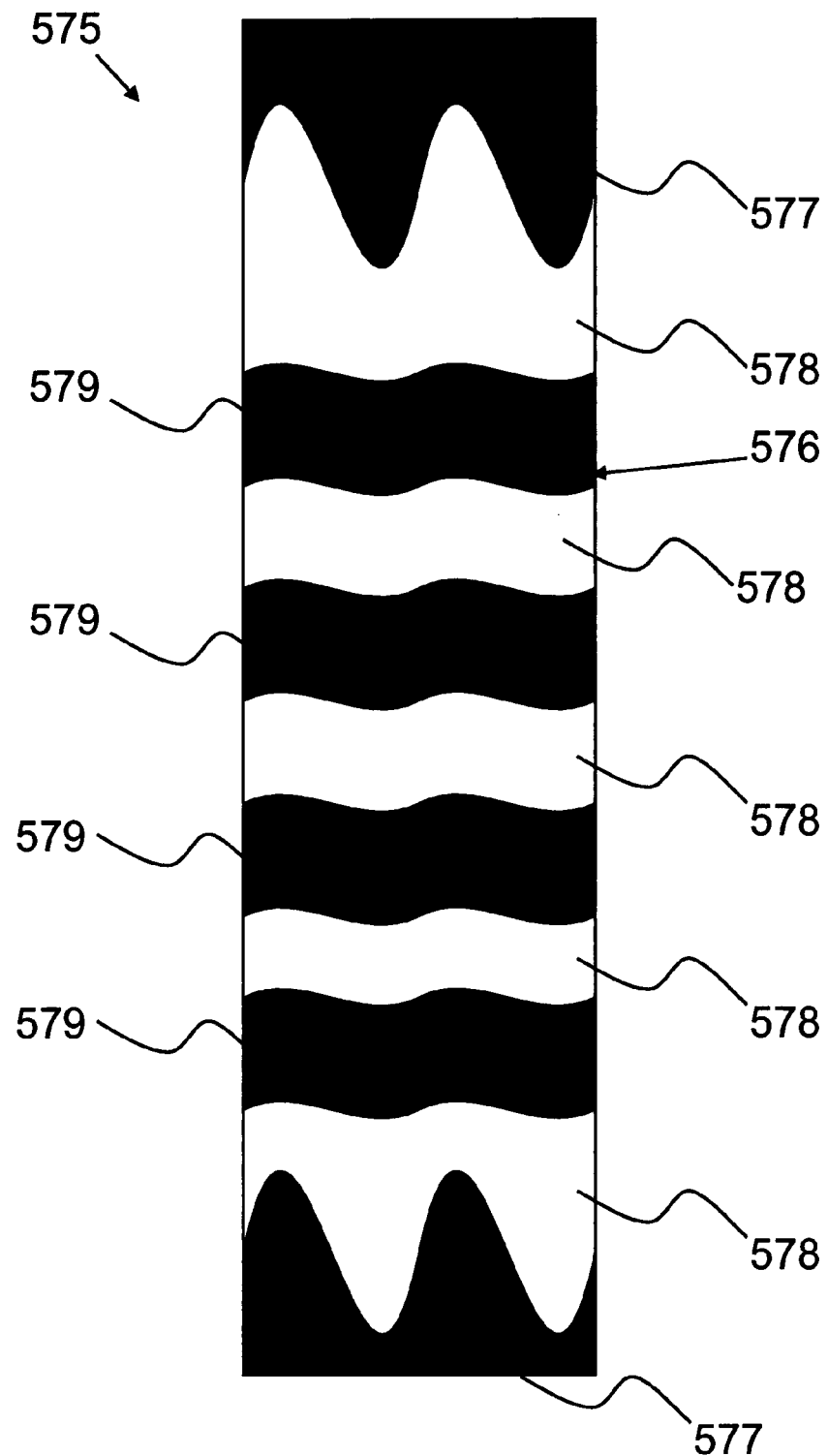
FIG. 5b illustrates another embodiment of the sleeve of the earpiece or wire organizer wherein the sleeve is an aftermarket item appointed to be placed on an existing earpiece.

FIGS. 5*a* and 5*b* illustrate schematic views of another embodiment of the earpiece/wire organizer, shown generally at 550 and 575, wherein the organizer is an aftermarket sleeve that can be applied to existing devices. Referring to FIG. 5*a*, sleeve 556 is provided to be attached to the wire of a headphone. Placement of sleeve 556 on the wire can be achieved by a number of methods. For example: sleeve 556 may include an elongated slit 560 for receiving the wire; sleeve 556 may be a coil like structure which is wrapped around the wire; or sleeve 556 may simply be slid over the wire. Sleeve 556 is comprised of a top/proximal end 557 and a bottom/distal end 558. Proximal end 557 and distal end 558 are appointed to be attached to the wire so that the wire is affixed to proximal end 557 and distal end 558. Sleeve 556 further comprises alternating spine pieces 561, 562 that engage with one another to compress and elongate the headphone wire. Referring to FIG. 5*b*, a sleeve 576 is retrofit upon a wire 577 of headphones or earphones. The sleeve 576 is made up of a flexible rubber material that is cut like a spring or a coil. The sleeve 576 can twist onto any pre-existing wire 577. Mating spine pieces are shown at 578, while open spaces in the twist or coil of the sleeve 576 are shown at 579. For a single or unilateral wire 577 a coating of Velcro is applied so that the male and female spine pieces 578 alternate with a hook side and a loop side for mating engagement. For a double wire or Y-shaped headphone configuration, the male and female pieces 578 may be on separate sleeves 576 so that the sleeves engage.

Figure 6:
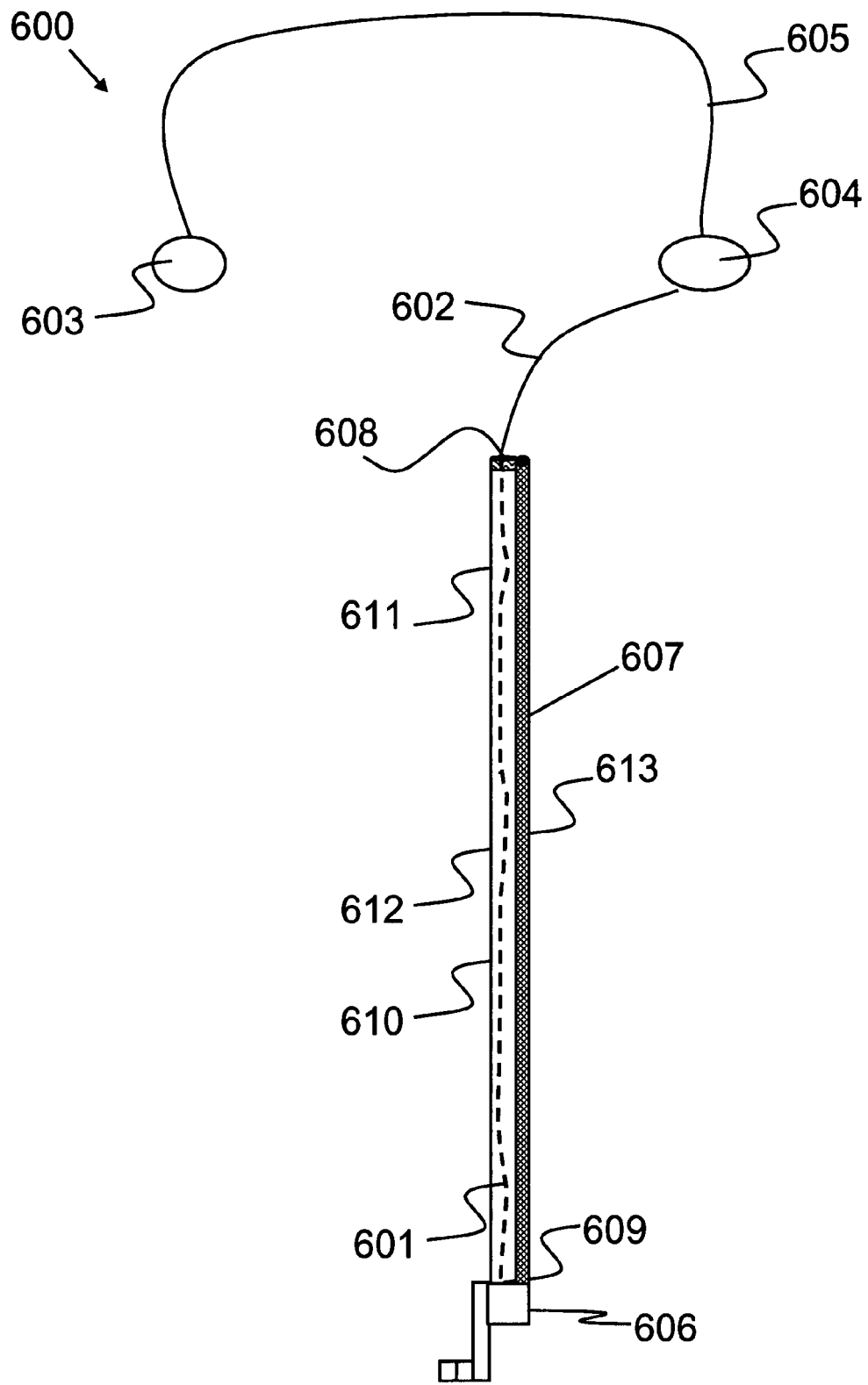
FIG. 6 illustrates an embodiment of the earpiece or wire organizer shown in a substantially elongated/lengthened/or extended form, wherein the organizer includes a first sleeve with first mating spine pieces generally housing a unilateral wire as utilized in earpieces for cellular phones or other electronic devices.

FIG. 6 illustrates an embodiment of the earpiece or wire organizer shown in a substantially elongated/lengthened/or extended form, wherein the organizer includes a first sleeve with first mating spine pieces generally housing a unilateral wire as utilized as earpieces for cellular phones or other electronic devices, shown generally at 600. Wire 601 is part of a headphone that is a unilateral type headphone set having a single unilateral audio wire 602 with ear buds 603, 604 connected by way of support wire 605. Audio wire 602 has an adaptor 606 appointed to engage with an electronic device by way of electronic device's headphone or audio jack. Wire organizer 600 includes at least one flexible first sleeve 607 having a proximal end 608, distal end 609, central body 610, and an interior cavity 611. First sleeve 607 may be manufactured as part of the wire 601 or may be an after market attachment to wire 601. Preferably, first sleeve 607 is constructed as an elongated cylinder structure. First mating spine pieces 612 and 613 are arranged in alternating relation along the length of sleeve 607. These first mating spine pieces 612 and 613 are appointed to releaseably engage with one another when sleeve 607 is coiled upon itself to neatly stow wire 601 housed therein.

Figure 7:
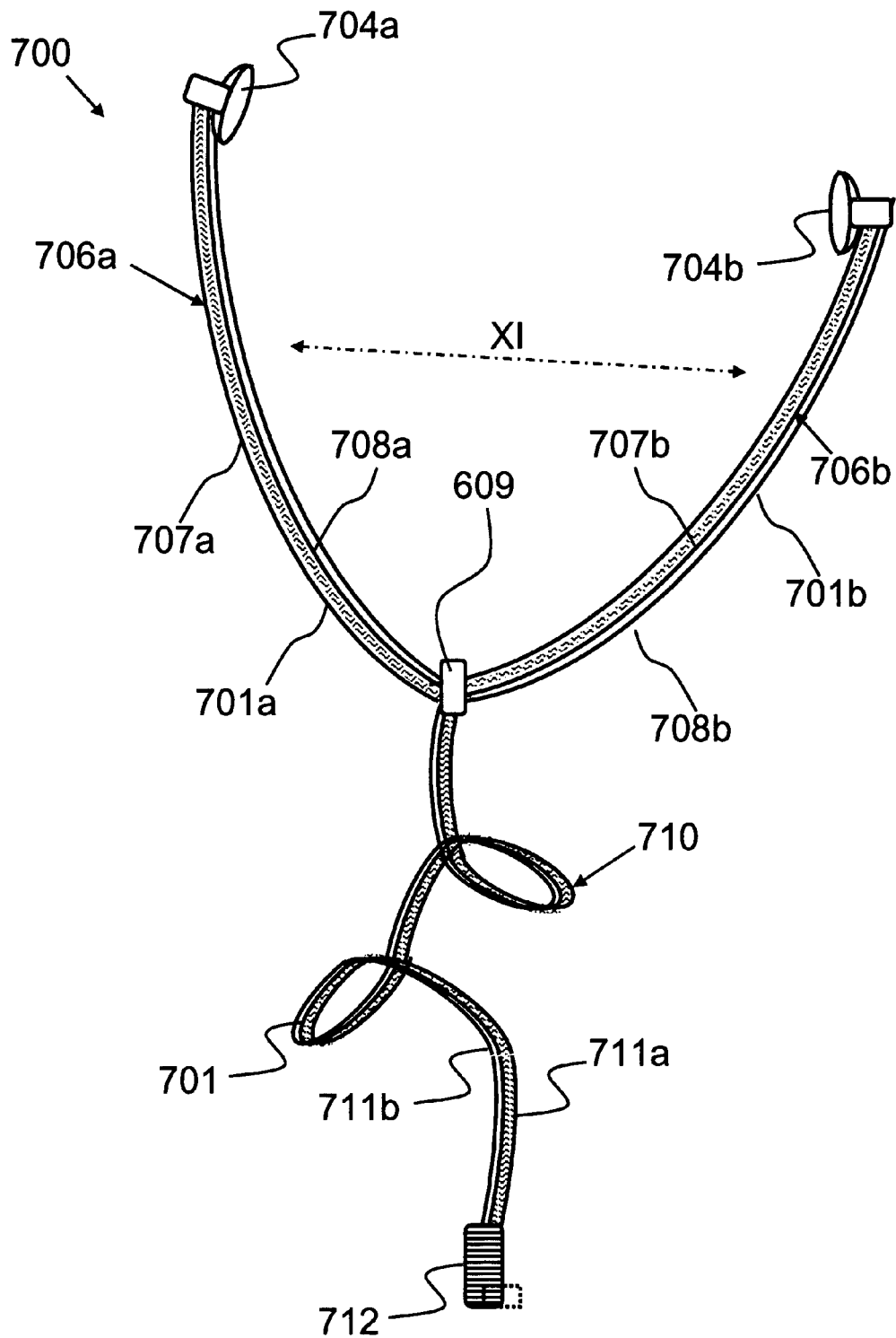
FIG. 7 illustrates an embodiment of the earpiece or wire organizer shown in a substantially elongated/lengthened/or extended form, wherein the organizer includes a first and second sleeve with first and second mating spine pieces generally housing headphone wires having a Y-shaped construction with dual audio wires attached to ear buds.

FIG. 7 illustrates an embodiment of the earpiece or wire organizer shown in a substantially elongated or extended form, wherein the organizer includes a first and second sleeve with first and second mating spine pieces generally housing a headphone wires having a Y-shaped construction with dual audio wires attached to ear buds, shown at 700. In this embodiment, the headphone involves a Y-shaped construction with audio wires 701*a* and 701*b* attached to ear buds 704*a* and 704*b*, respectively. Audio wires 701*a*, 701*b* feed from main wire 701 at divider 709. Main wire 701 is attached to an adapter portion 712 appointed to be plugged-in to a jack of an electronic device. A first sleeve is shown at 706*a* for housing left wire 701*a*; a second sleeve 706*b* is provided for housing right wire 701*b*. First and second sleeves 706*a*, 706*b* each comprise oppositely arranged first and second mating spine pieces 707*a*, 708*a* and 708*b*, 708*a* so that each of first and second sleeves 706*a*, 706*b* can be releaseably attachable to one another as shown by XI. Between divider 709 and adapter portion 712 a base sleeve 710 with alternating spine pieces 711*a*, 711*b* may be provided so that this lower wire portion may coiled upon itself of attached to a patch or the like.

Figure 8A:
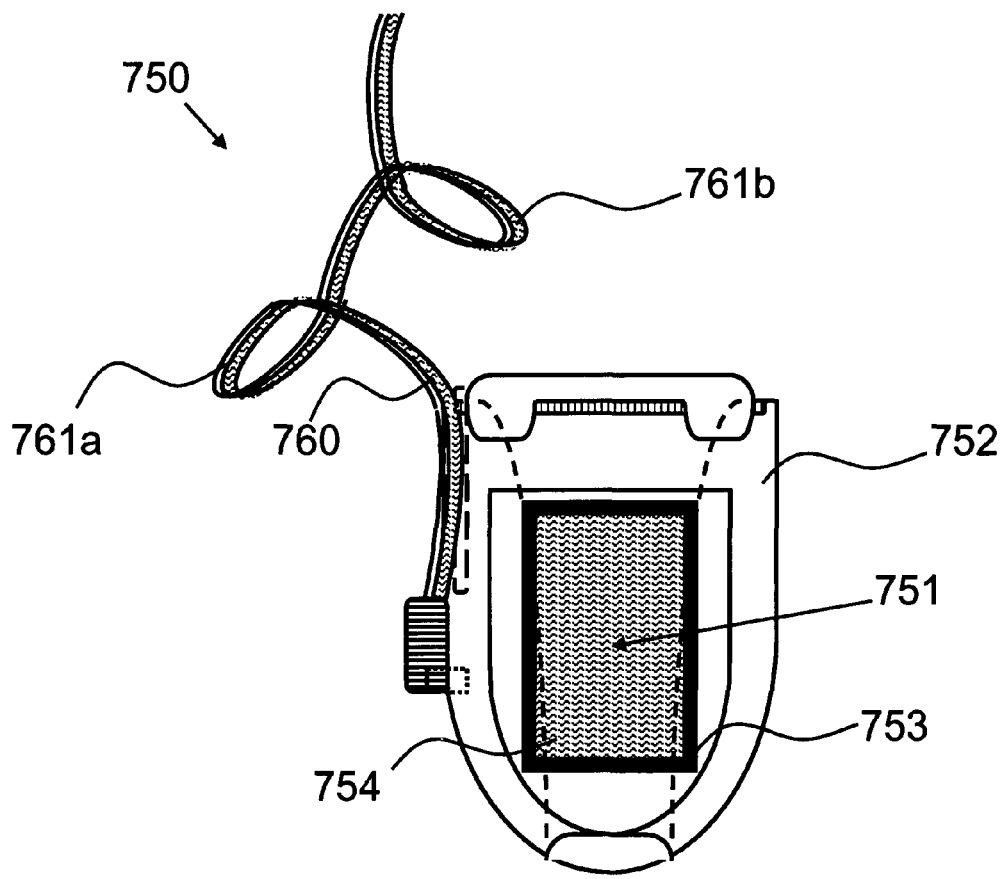
FIG. 8a illustrates a schematic view of an embodiment including a separate patch member with a patch back and a patch front, the patch back being attached to a cellular phone and the patch front having hook fasteners thereon for engaging with a sleeve of the wire organizer when the sleeve is not engaged with the patch front.
Figure 8B:
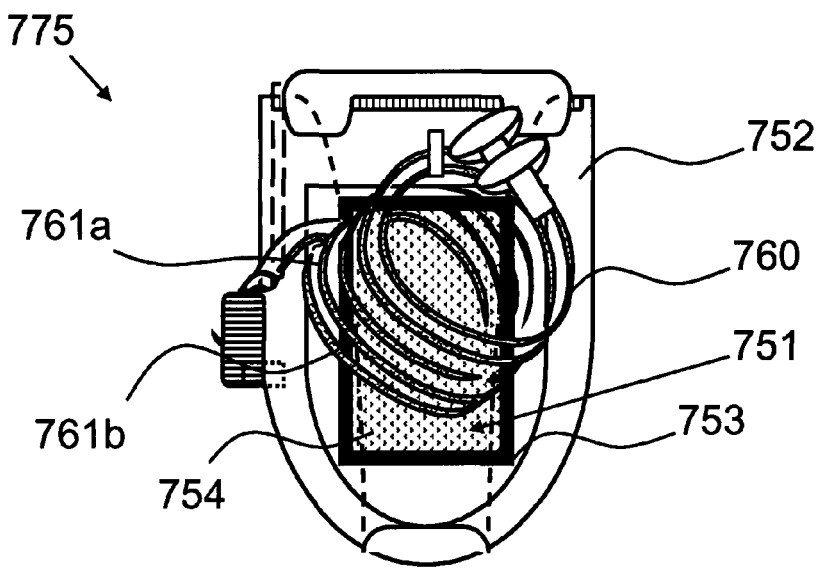
FIG. 8b illustrates a schematic view of the embodiment of FIG. 8a wherein the sleeve is engaged with the patch front.

FIGS. 8*a* and 8*b* illustrate schematic views of an embodiment including a separate patch member attached to a cellular phone, shown at 750 and 775, respectively. A patch 751 is attached to a cell phone 752. Patch 751 has a patch back 753 and a patch front 754. Patch front 754 is appointed to releaseably attach to a sleeve 760 with a wire housed therein. Preferably, patch front 754 comprises a hook or eye fastening surface appointed to releaseably attach to mating spine pieces 761*a*, 761*b* having alternating hook and eye surfaces of sleeve 760. Patch back 753 is adhered to a surface of cellular phone 752 or to a mobile apparatus selected from a group consisting of a music or audio device, belt clip, belt buckle, arm band, or wrist band.

Figure 9:
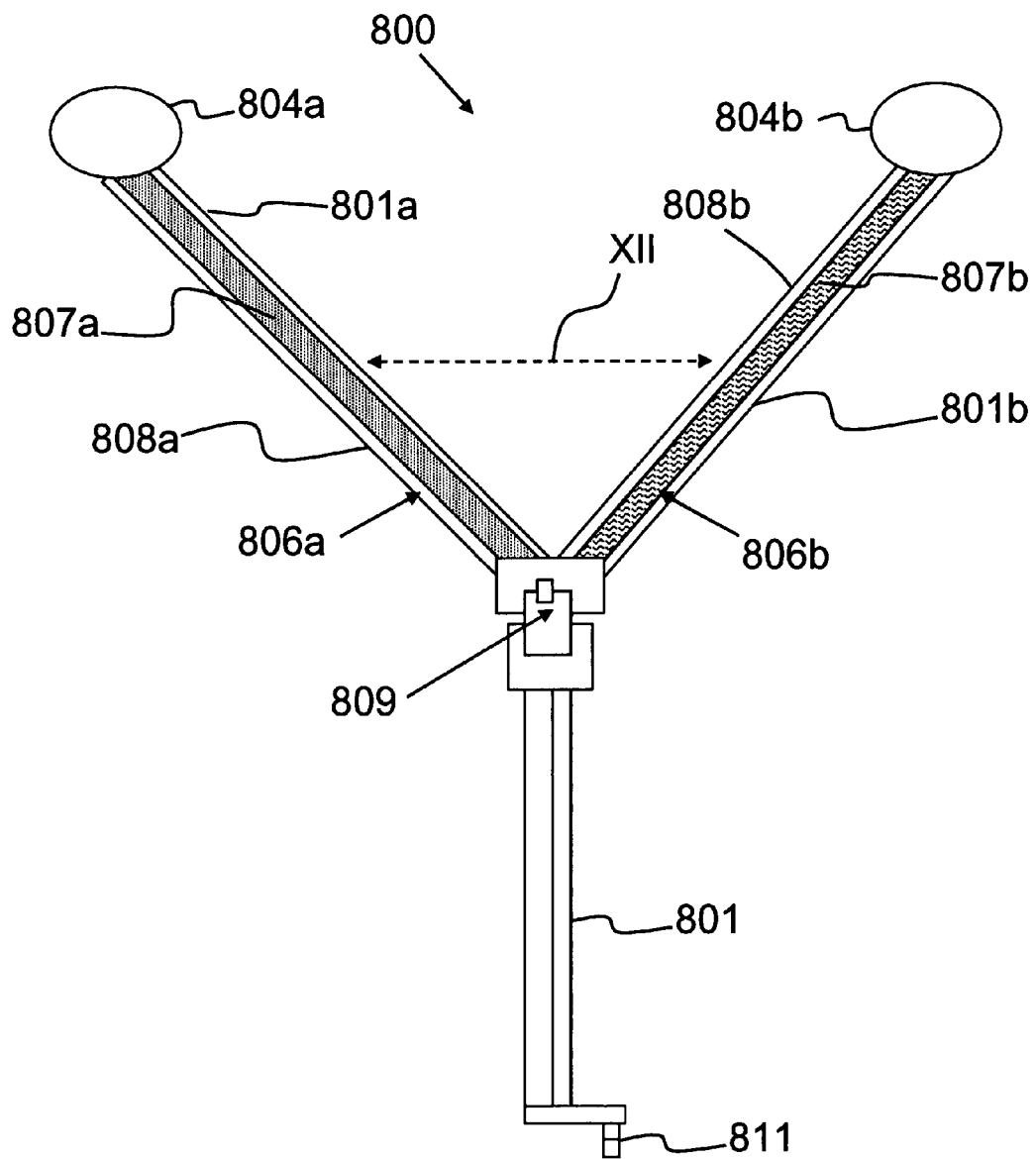
FIG. 9 illustrates a schematic view of an embodiment of a wire organizer wherein first and second sleeves are provided to house wires of a headphone set having a Y-shaped configuration, and the first and second sleeve are in engagement with one another.

FIG. 9 illustrates a schematic view of an embodiment of a wire organizer wherein first and second sleeves are provided to house wires of a headphone set having a Y-shaped configuration, wherein the first and second sleeve engage with one another, shown generally at 800. In this embodiment, the headphone involves a Y-shaped construction with audio wires 801a and 801b attached to ear buds 804a and 804b, respectively. Audio wires 801a, 801b feed from main wire 801 at divider 809. Main wire 801 is attached to an adapter portion 811 appointed to be plugged-in to a jack of an electronic device. A first sleeve is shown at 806a for housing left wire 801a; a second sleeve 806b is provided for housing right wire 801b. First and second sleeves 806a, 806b each comprise oppositely arranged first and second mating spine pieces 807a, 808a and 808b, 808a so that each of first and second sleeves 806a, 806b can be releaseably attachable to one another as shown by XII.

Figure 10A:
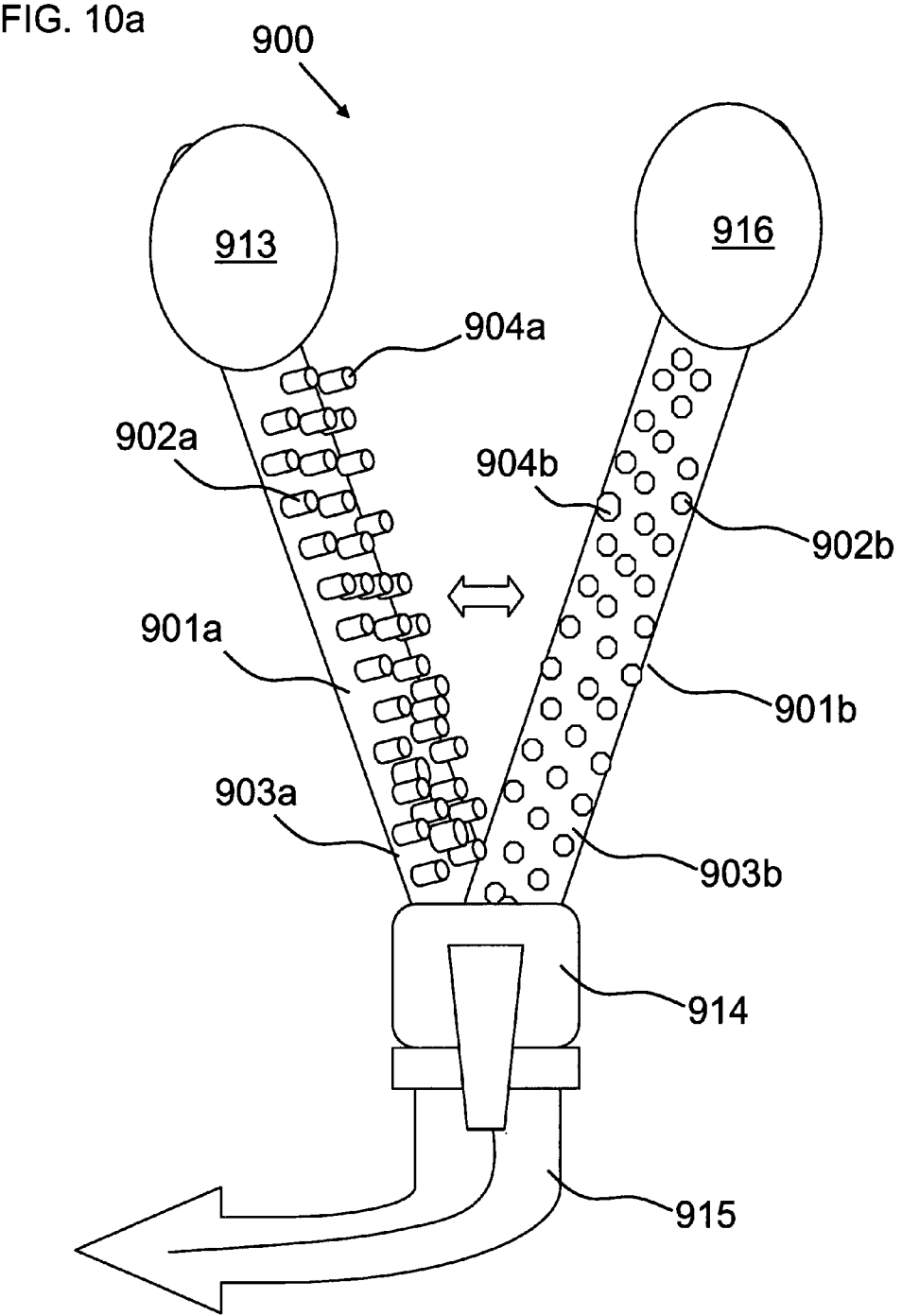
FIG. 10a illustrates a schematic view of an embodiment of a wire organizer wherein first and second sleeves are provided to house wires of a headphone set having a Y-shaped configuration, wherein the first and second sleeve engage with one another.

FIG. 10a illustrates a schematic view of an embodiment of a wire organizer wherein first and second sleeves are provided to house wires of a headphone set having a Y-shaped configuration, wherein the first and second sleeves engage with one another, shown generally at 900. Sleeves 901a and 901b each have at least one flat surface 903a and 903b extending lengthwise therealong. Sleeves 901a and 901b house y-shaped wires portions therein with ear buds 913 and 916, and being connected to a divider 914 and base wire 915 appointed to be plugged into an electronic device via a jack/adapter. First and second mating spine pieces 902a, 902b are located on sleeves 901a, 901b, respectively. These first and second mating spine pieces 902a, 902b comprise a plurality of knob members 904a, 904b projecting from surface 903a, 903b of each of sleeves 901a, 901b. Knob members 904a, 904b of first and second sleeves 901a, 901b are appointed to engage with one another to releaseably join first and second sleeves 901a, 901b, as is shown in FIG. 10b. FIG. 10b illustrates a schematic view of the spine pieces at 950 of the embodiment shown in FIG. 10a. Knobs 904a/904b resemble tentacle structures having a head portion 951 and body 952 wherein the head portion 951 interlocks with knobs 904a/904b of the corresponding sleeve 901a/901b to releaseably interlock the sleeves 901a and 901b together.

Figure 11:
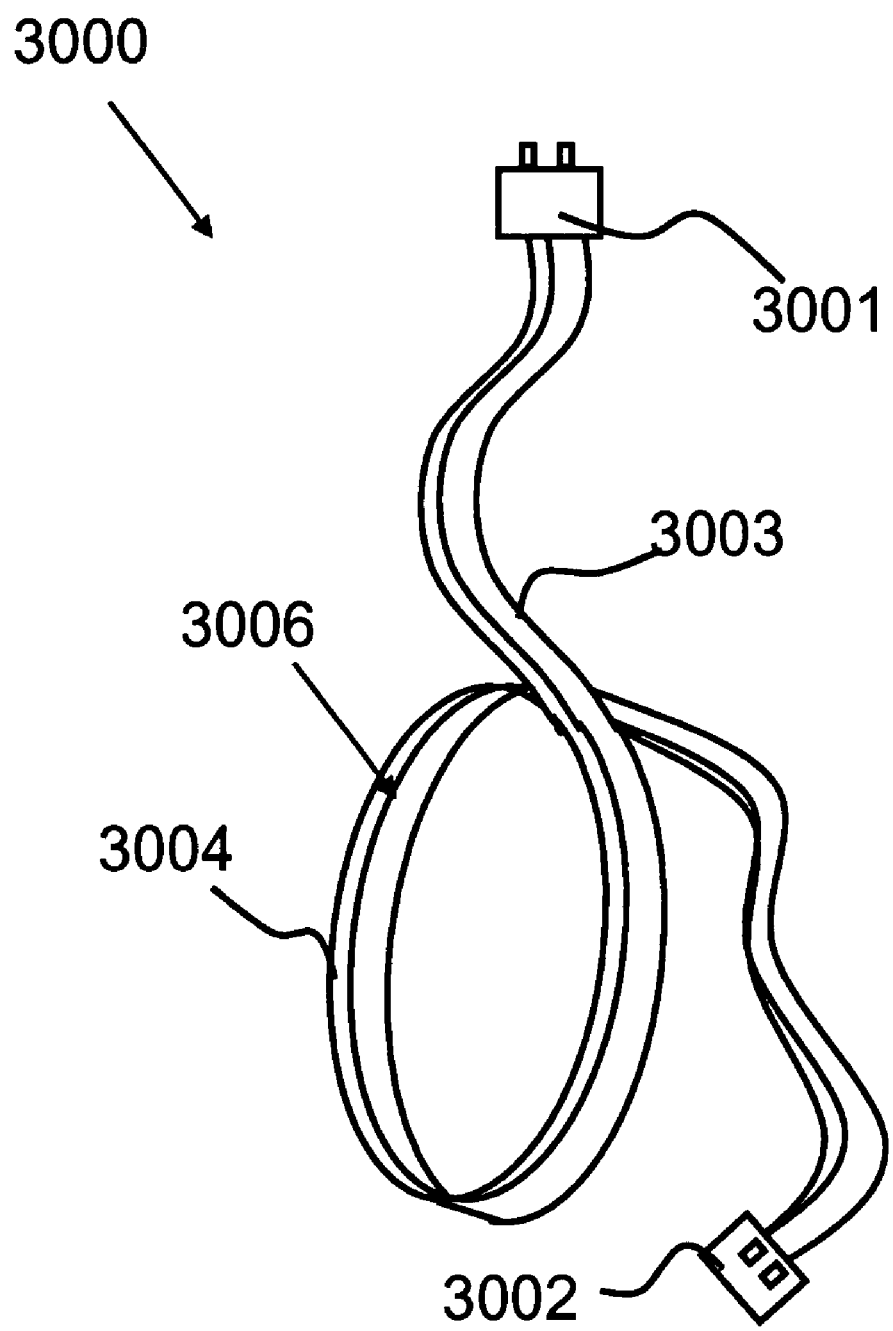
FIG. 11 illustrates an embodiment of a wire organizer wherein the wire located within a first sleeve is an integral part of a cord, the first mating spine pieces of the first sleeve releaseably engaging with one another when the sleeve with the cord therein is coiled upon itself.
Figure 12:
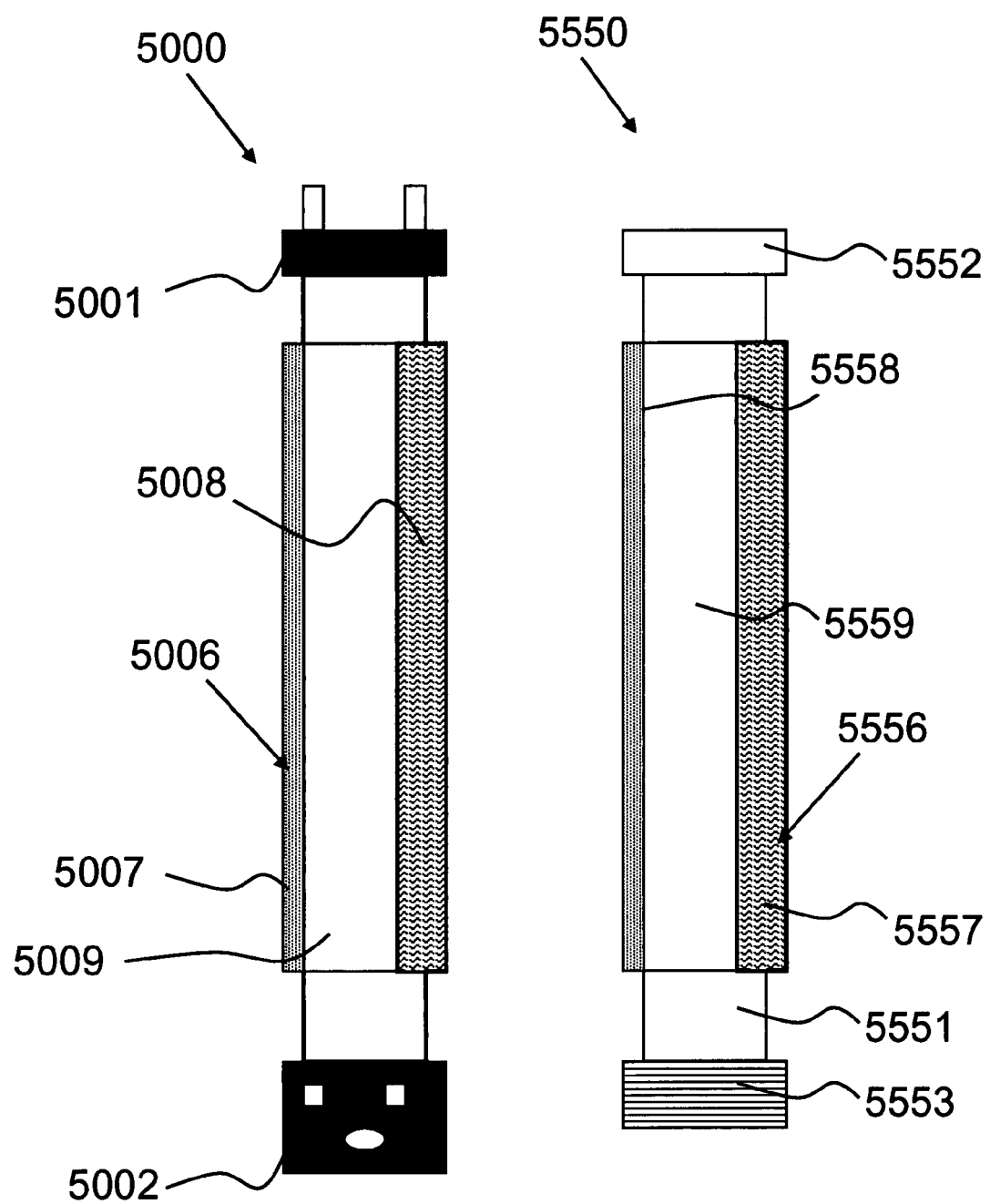
FIG. 12 shows an embodiment of the wire organizer wherein a first and second sleeve is provided on a plurality of electrical cords, and the sleeves are appointed to engage with one another to releaseably join the electrical cords.

Other applications utilizing similar construction of the sleeves of the wire organizer include use in maintaining organization for electrical wires of various sorts. Such applications are illustrated in FIGS. 11 and 12. In FIGS. 11 and 12, an electrical cord is shown at 3000, 5000 with a sleeve 3006, 5006 thereon. FIG. 12 further shows a hose at 5550. Electrical cord 3000, 5000 includes a pronged portion 3001, 5001 and an outlet portion 3002, 5002. Sleeve 3006, 5006 includes mating spine pieces generally including a female portion 3003, 5008 and a male portion 3004, 5007 which releaseably engage and disengage with one another when the wire 3000, 5000 (or hose 5550) is coiled or laid straight, respectively. Hose 5550 includes a hose body 5551 having a mouth 5552 and an attachment end 5553. A sleeve 5556 houses a substantial portion of hose body 5551. Sleeve 5556 is composed of shrink wrap 5559 with mating spine pieces comprising a female portion 5558 and a male portion 5557 on the sides thereof, which releasable engage and disengage with one another when hose 5555 is coiled or laid straight, respectively. Preferably, female portion 3003, 5008, 5558 comprises a female channel, while male portion 3004, 5007, 5557 comprises a mating spine appointed to be received within the channel of female portion 5008, 5558. Most preferably, female portion 3003, 5008, 5558 comprises a Velcro surface, while male portion 3004, 5007, 5557 comprises a mating Velcro surface appointed to engage with and fasten to the Velcro surface of female portion 3003, 5008, 5558. Shrink wrap 5009, 5559 preferably makes up the center of sleeve 5006, 5556. Sleeve 3006, 5006, 5556 can be used for hoses or the like as well and can be attached to shrink wrap and sold by the foot for aftermarket application to the hose, electrical wire, or the like. As a result, the wires and hoses lay in a flat coiled condition when stored as the male and female portions engage or fasten to one another so that the wires/hoses are neatly maintained. Additionally, an engaging floor mat may be provided having a Velcro mating surface so that when the electrical wire 3000, 5000 or hose 5550 is extended and being used the male 3004, 5007, 5557 or female 3003, 5008, 5558 side of the sleeve 3006, 5006, 5556 will fasten or engage to the engaging floor mat. In this manner, the cord 3000, 5000 or hose 5550 will be releaseably adhered to the floor and tripping over such cords 3000, 5000 or hoses 5550 will be vastly avoid.

Construction of cord 3000, 5000 and hose 5550 in accordance with the present invention provides the following advantageous: (i) less storage space needed; (ii) neat storage with orderly stacking ability; (iii) reduces the risk of accidents due to entanglement or tripping; and (iv) ultimately yields a longer cord life by preventing damage associated with knotting, entanglement, and trauma due to tripping. In application, the sleeve 3006, 5006, 5556 composed of a shrink wrap material is simply placed upon or wrapped on the body of the cord or hose and heat is applied (i.e. by a hairdryers or the like) so that the sleeve 3006, 5006, 5556 conforms to the shape of the cord or hose. These embodiments have particular applications in retro-fitting any hose or wire as an aftermarket sleeve with the appointed fastening means is provided.

Figure 14:
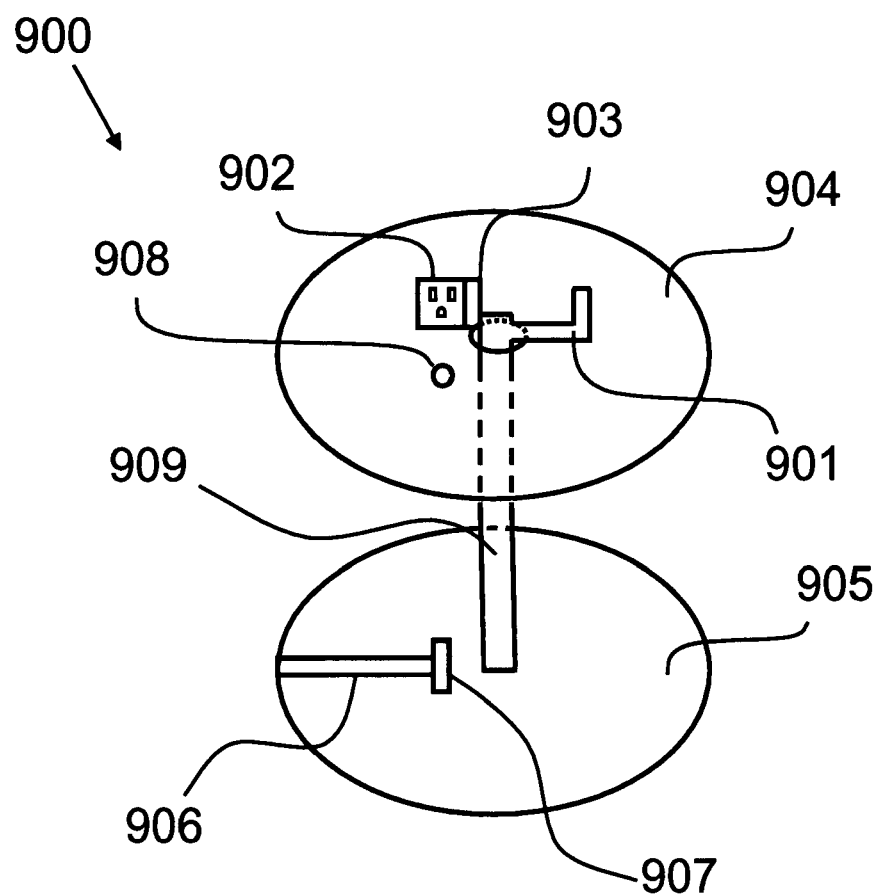
FIG. 14 illustrates a view of a winder for winding the first sleeve and spooling same upon itself.

The embodiments of FIGS. 11 and 12 may further be used in conjunction with a universal winder as is shown in FIG. 14 generally at 9000. Winder 9000 includes a winder body having a handle 9001 with a universal plug outlet adapter 9002 and universal adapter slot 9003 constructed therein. The body of winder 9000 has a top 9004 with a hole 9008 to accommodate a wire or hose end, and a bottom 9005 connected by way of a cylinder 9009, which is in turn connected to handle 9001. A slide 9006 and a connector 9007 are provided in bottom 9005 of winder 9000. Connector 9007 is appointed to force male and female portions together during winding of the wire or cord.

Figure 13A:
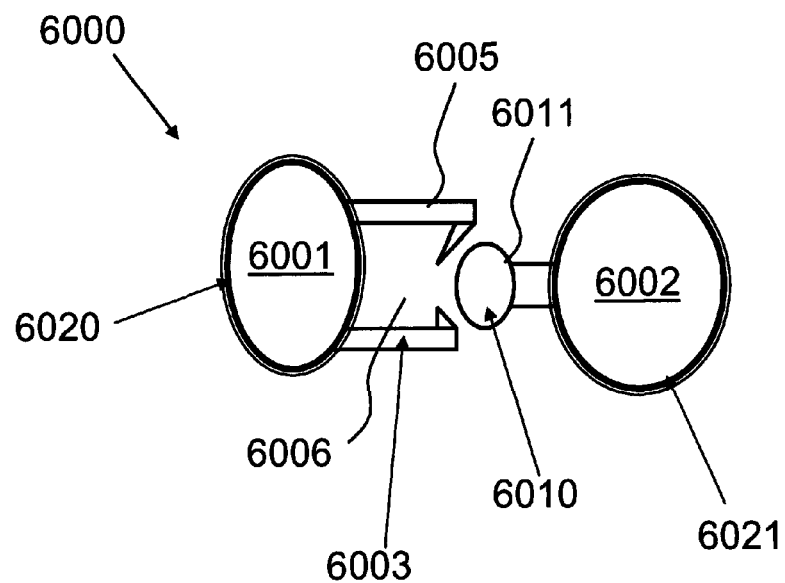
FIGS. 13a-13d show alternative embodiments of the wire organizer.
Figure 13B:
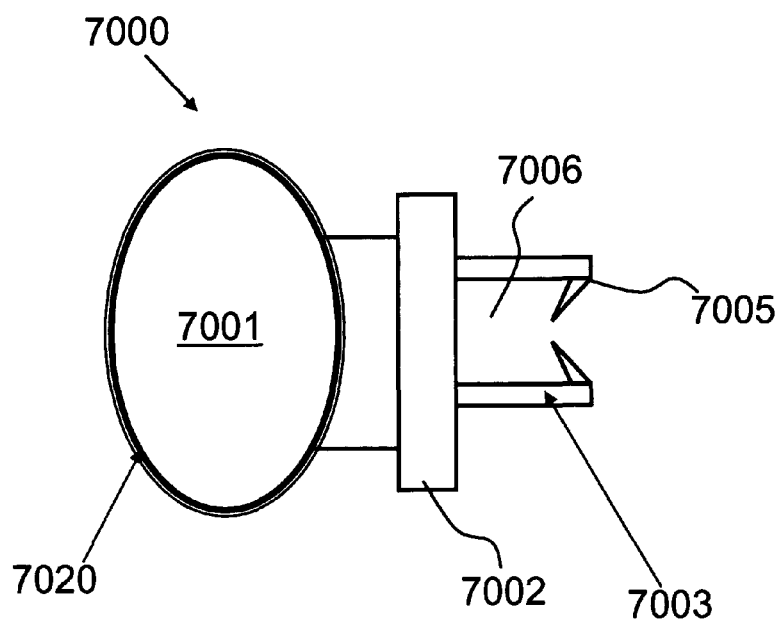
Figure 13C:
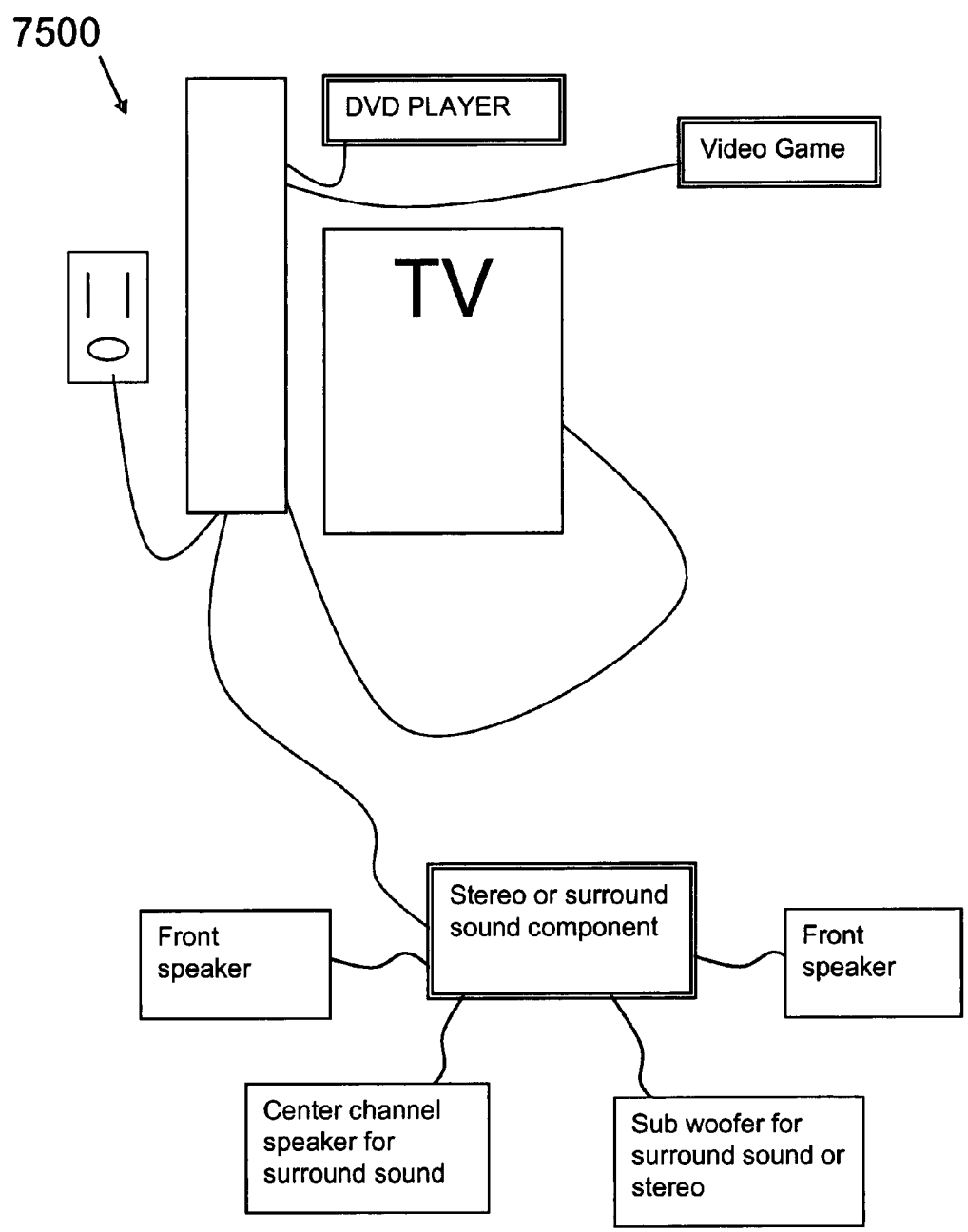
Figure 13D:
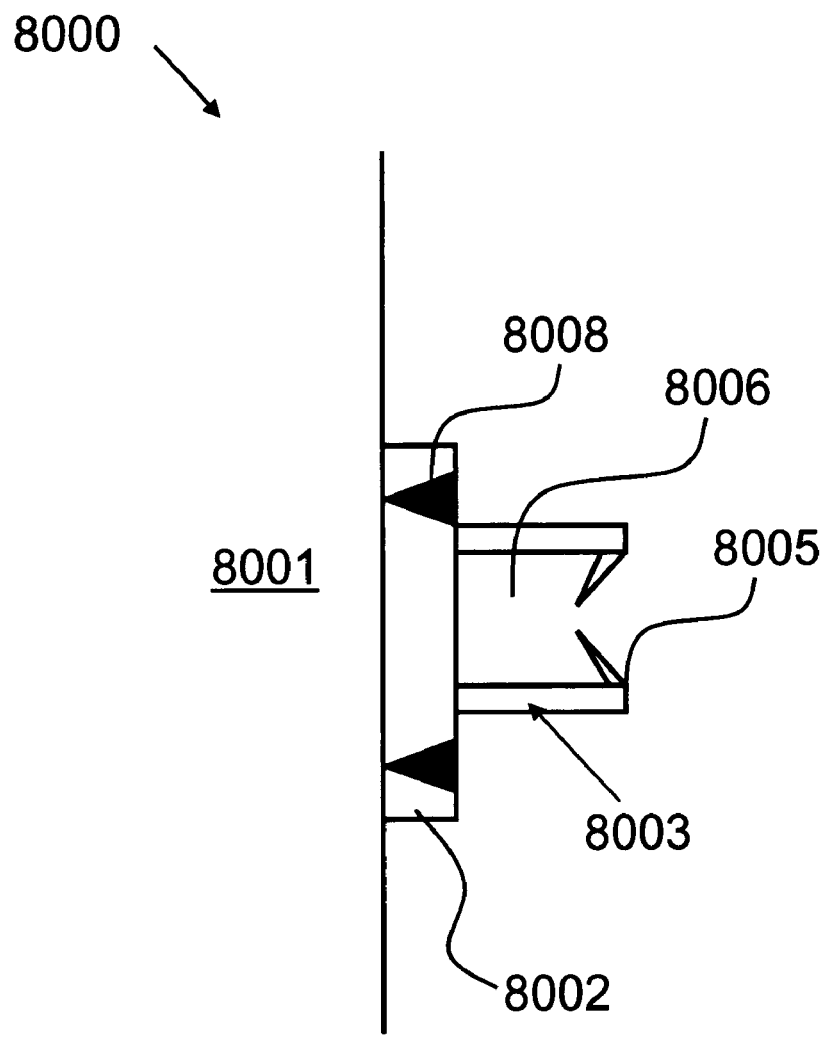

FIGS. 13a-13d illustrate embodiments of male and female fastener portions, shown at 6000, 7000, 7500 and 8000, respectively. FIG. 13a illustrates a cross sectional view of the fastener portions when the sleeve is on a wire/wires. A first wire member 6001 and a second wire member 6002 is shown (these wire members 6001, 6002 may be portions of the same wire, or separate wires). First wire member 6001 is located inside first sleeve 6020; second wire member 6002 is located inside second sleeve 6021. First sleeve 6020 of first wire member 6001 includes a male fastening portion 6003 appointed with a pair of tentacles or hooks 6005 (as in Velcro and other fastening mechanisms) constructed to form an opening 606. Second sleeve 6021 of second wire member 6002 includes a female fastening portion 6010 appointed with a channel or loop 6011 constructed to enter and be housed within opening 6006 of male fastening portion 6003 when fastening is engaged. FIG. 13b illustrates a cross sectional view of the fastener portions when the sleeve is on a wire/wires, shown generally at 7000; FIG. 13c illustrates application of the fastener to neatly organize and store wires of electrical devices, shown generally at 7500. A wire member 7001 is provided with a sleeve 7020 thereon. Sleeve 7020 includes a base 7002 with a male fastening portion 7003 thereon attached. Male fastening portion 7003 is appointed with a pair of tentacles or hooks 7005 (as in Velcro and other fastening mechanisms) constructed to form an opening 7006 appointed to receive and house a female fastening portion (not shown) on another sleeve or sleeve portion. Alternatively, a wire or cord itself can fit directly within the tentacles 7005 of the male fastening portion 7003. This embodiment allows use to go from a larger or smaller wire connection or vice versa; and can be made in many configuration so that different gauge wires with different size male and female receptacles could be attached for organization to prevent entanglement and to neatly place wires so they are not lying disorderly on a floor. All wires used in the connection of the devices in FIGS. 13*a*-13*d* can be held together using the male and female connection method. FIG. 13*d* illustrates a cross sectional side view of an embodiment of the fastener portions wherein the fastener is mounted on a flat surface or on a flexible surface (such as on a sleeve attached to a cord, wire, or hose), shown generally at 8000. Fastener 8000 is attached to a surface 8001 by way of a plastic (flexible) or rubber base 8002. Nail or screw holes 8008 may be provided to mount base 8002 to surface 8001. A male fastening portion 8003 is attached to base 8002. Male fastening portion 8003 is appointed with a pair of tentacles or hooks 8005 (as in Velcro and other fastening mechanisms) constructed to form an opening 8006 appointed to receive and house a female fastening portion (not shown) on another fastening portion. Alternatively, a wire or cord itself can fit directly within the opening 8006 of tentacles 8005 of the male fastening portion 8003. This embodiment allows wires, cords and/or hoses to be mounted on a plethora of surfaces 8001 for efficient organization. Surface 8001 can represent a number of different applications, including: walls; doors; pipes; car firewalls and interiors; or the like, so that the applications of the fastener are numerous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A wire organizer, comprising:
   a. at least one flexible sleeve having a proximal end, distal end, central body, and an interior cavity, said sleeve being adapted to receive and house a substantial portion of a wire within said interior cavity;
   b. a plurality of mating spine pieces located on said flexible sleeve arranged in alternating relation capable of being releaseably engaged with one another at any orientation by scrunching or compressing said sleeve so that said spine pieces are appointed to releaseably engage with one another to decrease the distance between said proximal and distal ends to compress said flexible sleeve and conversely, when released to increase the distance between said proximal and distal ends to elongate said sleeve and said wire housed therein;
   c. said wire organizer is devoid of a zipper, zipper hooks or a zipper slider;
   d. said wire is part of an audio wire constructed for headphones, earpieces, headsets, or like devices;
   e. said sleeve is constructed as an elongated cylinder structure; and
   f. said sleeve is interstitially constructed within said wire during a manufacturing process;

whereby scrunching or compressing said sleeve engages said mating spine pieces to compress said wire housed therein when said wire is in non-use or shorter wire length is desired; and pulling on said sleeve disengages said mating spine pieces to lengthen said wire housed therein when said wire is in use or a longer wire length is desired.

2. A wire organizer as recited by claim 1, wherein said sleeve comprises a slit for inserting said wire into said sleeve so that said wire is removably housed therein.

3. A wire organizer as recited by claim 2, wherein said proximal end of said sleeve includes an upper attachment means appointed to be attached to a top portion of said wire housed within said sleeve, and wherein said distal end of said sleeve includes a lower wire attachment means appointed to be attached to a bottom portion of said wire housed within said sleeve so that said substantial portion of said wire is housed within said sleeve and is compressed and elongated when said spine pieces of said sleeve are compressed and elongated.

4. A wire organizer as recited by claim 1, wherein said spine pieces are connected to one another by way of a flexible spine member running lengthwise along said sleeve.

5. A wire organizer as recited by claim 1, wherein said interlocking self-adhering surface coated on each of said mating spine pieces comprises hook and eye fastener portions so that said interlocking self-adhering surface attaches to itself.

6. A wire organizer as recited by claim 1 comprising a separate patch member with a patch back and a patch front, said patch front being appointed to releaseably attach to said sleeve with said wire housed therein.

7. A wire organizer as recited by claim 6, wherein said patch front of said patch member comprises a hook or eye fastening surface appointed to releaseably attach to said plurality of mating spine pieces wherein said spine pieces have alternating hook and eye surfaces.

8. A wire organizer as recited by claim 6, wherein said patch back is adhered to a surface of a cellular phone.

9. A wire organizer as recited by claim 6, wherein said patch back is adhered to a surface of a mobile apparatus selected from a group consisting of a music or audio device, belt clip, belt buckle, arm band, or wrist band.

10. A wire organizer as recited by claim 1, wherein at least two of said sleeves are provided for housing a left and right wire of a headset having dual ear bud wires to form a left sleeve and a right sleeve.

11. A wire organizer as recited by claim 10, wherein said interlocking self-adhering surface coated on each of said left and right sleeves comprises hook and eye fastener portions so that said interlocking self-adhering surface attaches to itself and allows each of said left and right sleeves to be compressed and elongated, and said left and right sleeve to be releaseably attachable to one another.

12. A wire organizer as recited by claim 1 comprising a carrying pouch for housing said sleeve therein.

13. A wire organizer, comprising:
   a. a first sleeve constructed as an elongated cylinder structure that is adapted to receive and house a first wire, where said first wire is interstitially constructed within said first sleeve during a manufacturing process;
   b. first mating spine pieces located on said first sleeve releaseably engaging said spine pieces together at any orientation;
   c. said wire organizer is devoid of a zipper, zipper hooks or a zipper slider; and d. said interlocking self-adhering surface coated on each of said first mating spine pieces of said first sleeve is appointed to releaseably engage and attach to itself to decrease the distance between said proximal and distal ends to compress said flexible sleeve when said first sleeve is coiled upon itself.

14. A wire organizer as recited by claim 13, wherein said first wire is an integral part of a cord, wherein said wire and visa vie said cord is housed within said first sleeve, wherein said interlocking self-adhering surface coated on each of said first mating spine pieces of said first sleeve releaseably engages with itself when said sleeve with said cord therein is coiled upon itself.

15. A wire organizer as recited by claim 13 further comprising a winder for winding said first sleeve and coiling same upon itself.

16. A wire organizer as recited by claim 13 comprising a second sleeve adapted to receive and house a second wire, wherein said second sleeve comprises second mating spine pieces coated with said interlocking self-adhering surface and being appointed to engage with said interlocking self-adhering surface coated on said first mating spine pieces to releaseably attach said first and second sleeves together; said second sleeve is constructed as an elongated cylinder structure, and where said second wire is interstitially constructed within said second sleeve during a manufacturing process.

17. A wire organizer as recited by claim 16, wherein said interlocking self-adhering surface coated on each of said first and second mating spine pieces located on said first and second sleeves, respectively, comprises hook and eye fastener portions so that said interlocking self-adhering surface attaches to itself and engage with on another to releaseably join said first and second sleeves.

18. A wire organizer as recited by claim 16, wherein said first and second mating spine pieces located on said first and second sleeves, respectively, comprise mating hook and eye fastener portions appointed to engage with on another to releaseably join said first and second sleeves.

19. A wire organizer as recited by claim 18, wherein said patch back is adhered to a surface of a cellular phone.

20. A wire organizer as recited by claim 18, wherein said patch back is adhered to a surface of a mobile apparatus selected from a group consisting of a music or audio device, belt clip, belt buckle, arm band, or wrist band.

21. A wire organizer as recited by claim 16, wherein said first and second mating spine pieces located on said first and second sleeves, respectively, comprise mating tong and groove fastener portions appointed to engage with on another to releaseably join said first and second sleeves.

22. A wire organizer as recited by claim 13 comprising a separate patch member having a patch back and a patch front, said patch front being appointed to releaseably attach to said first sleeve.

23. A wire organizer as recited by claim 13, wherein said wire is an audio wire, such as for headphones, earpieces, headsets, or like devices.

* * * * *